(12) United States Patent
Mimura et al.

(10) Patent No.: US 10,829,129 B2
(45) Date of Patent: Nov. 10, 2020

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Kohei Okimoto, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 16/092,455

(22) PCT Filed: Apr. 18, 2016

(86) PCT No.: PCT/JP2016/062239
§ 371 (c)(1),
(2) Date: Oct. 10, 2018

(87) PCT Pub. No.: WO2017/183077
PCT Pub. Date: Oct. 26, 2017

(65) Prior Publication Data
US 2019/0118832 A1 Apr. 25, 2019

(51) Int. Cl.
*B60W 50/14* (2020.01)
*B60W 30/182* (2020.01)
(Continued)

(52) U.S. Cl.
CPC .......... *B60W 50/14* (2013.01); *B60W 30/182* (2013.01); *G05D 1/0061* (2013.01);
(Continued)

(58) Field of Classification Search
None
See application file for complete search history.

(56) References Cited

U.S. PATENT DOCUMENTS

| 5,774,069 | A  | * | 6/1998 | Tanaka | B60W 50/14 340/903 |
| 9,690,292 | B1 | * | 6/2017 | Chan   | B60W 40/09 |

(Continued)

FOREIGN PATENT DOCUMENTS

| JP | 09-161196    |   | 6/1997 |          |            |
| JP | 09161196  A  | * | 6/1997 | ............ | B60W 50/14 |

(Continued)

OTHER PUBLICATIONS

International Search Report and Written Opinion for International Application No. PCT/JP2016/062239 dated Jul. 5, 2016, 8 pgs.

*Primary Examiner* — Shelley Chen
(74) *Attorney, Agent, or Firm* — Amin, Turocy & Watson, LLP

(57) ABSTRACT

A vehicle control system includes an external environment recognition unit configured to recognize an external environment situation, an automated driving control unit configured to perform automated driving for automatically controlling at least one of acceleration/deceleration and steering of a subject vehicle, the automated driving control unit executing handover to switch a driving mode from an automated driving mode to a manual driving mode on the basis of the external environment situation recognized by the external environment recognition unit, a handover prediction unit configured to predict a possibility of occurrence of the handover on the basis of the recognized external environment situation, an output unit configured to output information, and an interface control unit configured to control the output unit so that information for prompting the vehicle occupant to prepare for the handover is output when the handover prediction unit predicts that the possibility of occurrence of the handover is high.

3 Claims, 13 Drawing Sheets

(51) Int. Cl.
    *G05D 1/00*     (2006.01)
    *G05D 1/02*     (2020.01)

(52) U.S. Cl.
    CPC ..... *G05D 1/0278* (2013.01); *B60W 2050/146* (2013.01); *B60W 2420/42* (2013.01); *B60W 2552/00* (2020.02); *B60W 2554/00* (2020.02); *B60W 2555/20* (2020.02); *B60W 2720/103* (2013.01); *G05D 2201/0213* (2013.01)

(56) References Cited

U.S. PATENT DOCUMENTS

| | | | | |
|---|---|---|---|---|
| 9,904,287 | B1* | 2/2018 | Kuffner, Jr. | G06T 19/006 |
| 10,067,505 | B2* | 9/2018 | Ichikawa | B60W 40/00 |
| 10,241,512 | B1* | 3/2019 | Chan | G05D 1/0088 |
| 2003/0230920 | A1* | 12/2003 | Itou | B60N 2/14 |
| | | | | 297/344.21 |
| 2015/0224932 | A1* | 8/2015 | Mohan | B60R 1/04 |
| | | | | 359/876 |
| 2016/0185354 | A1* | 6/2016 | Lisseman | H04N 5/33 |
| | | | | 701/36 |
| 2016/0191859 | A1* | 6/2016 | Lisseman | B60K 35/00 |
| | | | | 348/148 |
| 2016/0305787 | A1* | 10/2016 | Sato | G05D 1/0088 |
| 2017/0017233 | A1* | 1/2017 | Ichikawa | B60W 40/00 |
| 2017/0329329 | A1* | 11/2017 | Kamhi | G06K 9/00604 |
| 2018/0229743 | A1* | 8/2018 | Aoi | G05D 1/0088 |
| 2020/0241528 | A1* | 7/2020 | Ichikawa | G05D 1/0061 |

FOREIGN PATENT DOCUMENTS

| | | | | |
|---|---|---|---|---|
| JP | 2015-141050 | | 8/2015 | |
| JP | 2015141050 A | * | 8/2015 | ....... G08G 1/096844 |
| JP | 2015-210660 | | 11/2015 | |
| JP | 2015210660 A | * | 11/2015 | |
| JP | 2016-018238 | | 2/2016 | |

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on a technology for automatically controlling at least one of acceleration/deceleration and steering of a subject vehicle (hereinafter referred to as "automated driving") so that the subject vehicle travels along a route to a destination has been performed. In relation to this, a driving mode control device including a notification means for notifying an occupant of a handover for shifting from automated driving to manual driving is disclosed (see, for example, Patent Literature 1).

CITATION LIST

Patent Literature

[Patent Literature 1]
Japanese Unexamined Patent Application, First Publication No. 2016-018238

SUMMARY OF INVENTION

Technical Problem

The notification of the handover is performed at a timing directly before switching from automated driving to manual driving. In automated driving, a vehicle occupant may not be in a situation suitable for manual driving. For example, the vehicle occupant may not be looking forward sufficiently or may have assumed a relaxed sitting posture. Therefore, for example, the vehicle occupant is not in a situation in which the vehicle occupant can deal with manual driving when a notification of handover is performed, and thus the vehicle occupant may not be able to prepare for manual driving immediately in response to switching from automated driving to manual driving.

The present invention has been made in consideration of such circumstances, and an object of the present invention is to provide a vehicle control system, a vehicle control method, and a vehicle control program capable of enabling a vehicle occupant to be ready for manual driving at a timing when handover from automated driving to manual driving is performed.

Solution to Problem

An invention according to claim 1 is a vehicle control system including: an external environment recognition unit (142) configured to recognize an external environment situation; an automated driving control unit (120) configured to perform automated driving for automatically controlling at least one of acceleration/deceleration and steering of a subject vehicle, the automated driving control unit executing handover to switch a driving mode from an automated driving mode to a manual driving mode on the basis of the external environment situation recognized by the external environment recognition unit; a handover prediction unit (155) configured to predict a possibility of occurrence of the handover on the basis of the external environment situation recognized by the external environment recognition unit; an output unit (70) configured to output information; and an interface control unit (170) configured to control the output unit so that information for prompting a vehicle occupant to prepare for the handover is output when the handover prediction unit predicts that the possibility of occurrence of the handover is high.

An invention according to claim 2 is the vehicle control system according to claim 1, wherein the interface control unit controls the output unit so that the information is output at a predetermined timing before the vehicle reaches a point at which the possibility of occurrence of the handover predicted by the handover prediction unit is high.

An invention according to claim 3 is the vehicle control system according to claim 1, further including: a vehicle occupant situation acquisition unit (171) configured to acquire a situation of a vehicle occupant inside a vehicle who performs a driving operation when manual driving is executed, wherein the interface control unit determines whether the information for prompting preparation for the handover is able to be output on the basis of a vehicle occupant situation acquired by the vehicle occupant situation acquisition unit.

An invention according to claim 4 is the vehicle control system according to claim 1, further including: a vehicle occupant situation acquisition unit (171) configured to acquire a situation of a vehicle occupant inside a vehicle who performs a driving operation when manual driving is executed, wherein the interface control unit changes an output aspect of the information for prompting preparation for the handover on the basis of a vehicle occupant situation acquired by the vehicle occupant situation acquisition unit.

An invention according to claim 5 is a vehicle control method including: recognizing, by an in-vehicle computer, an external environment situation, executing, by the in-vehicle computer, handover to switch a driving mode from an automated driving mode to a manual driving mode on the basis of the recognized external environment situation when performing automated driving for automatically controlling at least one of acceleration/deceleration and steering of a subject vehicle, predicting, by the in-vehicle computer, a possibility of occurrence of the handover on the basis of the recognized external environment situation, and controlling, by the in-vehicle computer, an output unit configured to output information so that information for prompting a vehicle occupant to prepare for the handover is output when the possibility of occurrence of the handover is predicted to be high.

An invention according to claim 6 is a vehicle control program for causing an in-vehicle computer to execute a process of: recognizing an external environment situation, executing handover to switch a driving mode from an automated driving mode to a manual driving mode on the basis of the recognized external environment situation when performing automated driving for automatically controlling at least one of acceleration/deceleration and steering of a subject vehicle, predicting a possibility of occurrence of the handover on the basis of the recognized external environment situation, and controlling an output unit configured to output information so that information for prompting a vehicle occupant to prepare for the handover is output when the possibility of occurrence of the handover is predicted to be high.

Advantageous Effects of Invention

According to the inventions according to claims 1, 5, and 6, when the possibility of occurrence of handover from automated driving to manual driving is high according to the external environment situation, it is possible to output the information for prompting preparation for handover at a timing before the occurrence of handover. Thus, it is possible for the vehicle occupant to be ready for manual driving at a timing when handover from automated driving to manual driving is performed.

According to the present invention according to claim 2, it is possible to output the information for prompting preparation for handover at a timing before the vehicle reaches the point at which the possibility of occurrence of the handover is high in response to the prediction of the point at which the possibility of occurrence of handover from the automated driving to the manual driving in a preceding traveling route is high in a state in which the automated driving is being executed. Thus, it is possible to output the information for prompting preparation for handover from automated driving to manual driving at an appropriate timing.

According to the present invention according to claim 3, it is possible to output or not to output the information for prompting preparation for handover according to the state of the vehicle occupant at a timing when it is determined that the possibility of occurrence of handover is high. Thus, when the vehicle occupant does not need to be prompted for the preparation for handover even in a situation in which the possibility of occurrence of handover is high, it is possible to avoid unnecessarily outputting the information for prompting the preparation for handover.

According to the present invention according to claim 4, it is possible to vary an aspect of output of the information for prompting preparation for the handover according to the situation of the vehicle occupant at a timing when it is determined that the possibility of occurrence of the handover is high. Thus, it is possible to output appropriate content for the information for prompting preparation for the handover, for example, according to a degree to which the vehicle occupant can prepare for the manual driving.

DESCRIPTION OF EMBODIMENTS

Hereinafter, embodiments of a vehicle control system, a vehicle control method, and a vehicle control program according to the present invention will be described with reference to the drawings.

<Common Configuration>

Figure 1:
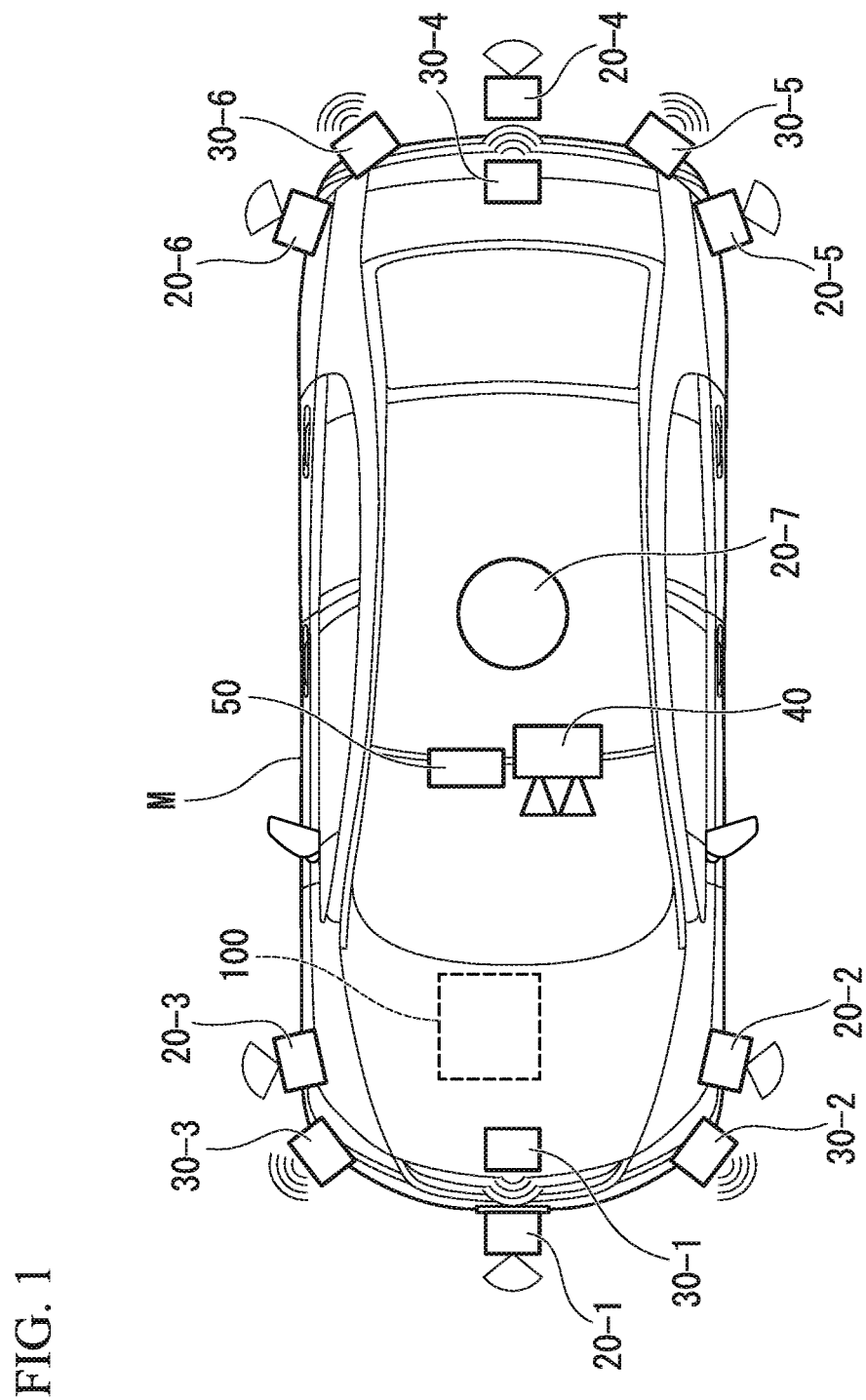
FIG. 1 is a diagram illustrating components of a vehicle in which a vehicle control system 100 according to an embodiment is mounted.

FIG. 1 is a diagram illustrating components included in a vehicle in which a vehicle control system 100 of an embodiment is mounted (hereinafter referred to as a subject vehicle M). The vehicle in which the vehicle control system 100 is mounted is, for example, a two-wheeled car, a three-wheeled car, or a four-wheeled car, examples of which include a car using an internal combustion engine such as a diesel engine or a gasoline engine as a power source, an electric car using an electric motor as a power source, or a hybrid car with an internal combustion engine and an electric motor. Further, the electric car is driven using electric power that is discharged by a battery such as a secondary battery, a hydrogen fuel cell, a metal fuel cell, or an alcohol fuel cell, for example.

As illustrated in FIG. 1, sensors such as finders 20-1 to 20-7, radars 30-1 to 30-6, and a camera 40, a navigation device (a display unit) 50, and the vehicle control system 100 are mounted in the subject vehicle M.

The finders 20-1 to 20-7 are, for example, light detection and ranging or laser imaging detection and ranging (LIDAR) that measures scattered light from irradiation light and measures a distance to a target. For example, the finder 20-1 may be attached to a front grille or the like, and the finders 20-2 and 20-3 may be attached to a side surface of a vehicle body, a door mirror, the inside of a headlight, the vicinity of side lamps, and the like. The finder 20-4 is attached to a trunk lid or the like, and the finders 20-5 and 20-6 are attached to the side surface of the vehicle body, the inside of a taillight, or the like. The finders 20-1 to 20-6 described above have, for example, a detection area of about 150° in a horizontal direction. Further, the finder 20-7 is attached to a roof or the like. The finder 20-7 has, for example, a detection area of 360° in the horizontal direction.

The radars 30-1 and 30-4 described above are, for example, long-distance millimeter-wave radars of which the detection area in a depth direction is wider than those of other radars. Further, the radars 30-2, 30-3, 30-5, and 30-6 are intermediate-distance millimeter wave radars of which the detection area in the depth direction is narrower than those of the radars 30-1 and 30-4.

Hereinafter, the finders 20-1 to 20-7 are simply referred to as a "finder 20" when not particularly distinguished, and the radars 30-1 to 30-6 are simply referred to as a "radar 30" when not particularly distinguished. The radar 30 detects an object using, for example, a frequency modulated continuous wave (FM-CW) scheme.

The camera 40 is, for example, a digital camera using a solid-state imaging device such as a charge coupled device (CCD) or a complementary metal oxide semiconductor (CMOS). The camera 40 is attached to an upper portion of a front windshield, a rear surface of a rearview mirror, or the like. The camera 40 periodically and repeatedly images, for example, in front of the subject vehicle M. The camera 40 may be a stereo camera including a plurality of cameras.

It should be noted that the configuration illustrated in FIG. 1 is merely an example, and a part of the configuration may be omitted or other components may be added.

Figure 2:
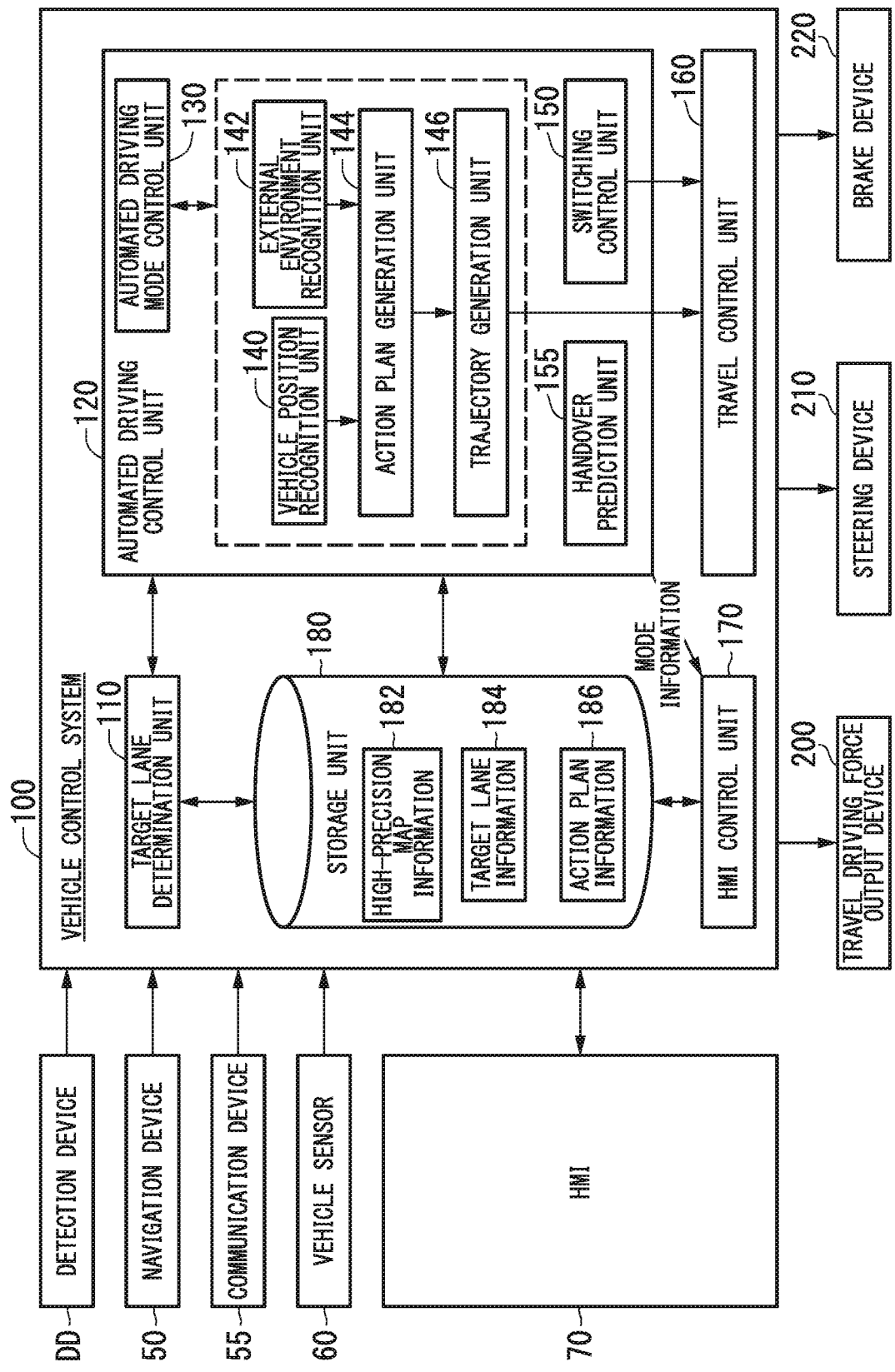
FIG. 2 is a functional configuration diagram centered on the vehicle control system 100 according to the embodiment.

FIG. 2 is a functional configuration diagram centered on the vehicle control system 100 according to the first embodiment. A detection device DD including a finder 20, a radar 30, a camera 40, and the like, a navigation device 50, a communication device 55, a vehicle sensor 60, a human machine interface (HMI) 70, a vehicle control system 100, a travel driving force output device 200, a steering device 210, and a brake device 220 are mounted on the vehicle subject M. These devices or instruments are connected to each other by a multiplex communication line such as a controller area network (CAN) communication line, a serial communication line, or a wireless communication network. It should be noted that a vehicle control system in the claims does not refer only to the "vehicle control system 100" but may include configurations (a detection unit DD, the HMI 70, or the like) other than the vehicle control system 100.

The navigation device 50 includes a global navigation satellite system (GNSS) receiver or map information (navigation map), a touch panel type display device functioning as a user interface, a speaker, a microphone, and the like. The navigation device 50 specifies a position of the subject vehicle M using the GNSS receiver and derives a route from the position to a destination designated by the user. The route derived by the navigation device 50 is provided to a target lane determination unit 110 of the vehicle control system 100. The position of the subject vehicle M may be specified or supplemented by an inertial navigation system (INS) using the output of the vehicle sensor 60. Further, the navigation device 50 performs guidance through speech or a navigation display for the route to the destination. It should be noted that a configuration for specifying the position of the subject vehicle M may be provided independently of the navigation device 50. Further, the navigation device 50 may be realized, for example, by a function of a terminal device such as a smartphone or a tablet terminal possessed by the user. In this case, transmission and reception of information is performed between the terminal device and the vehicle control system 100 through wireless or wired communication.

The communication device 55 performs wireless communication using, for example, a cellular network, a Wi-Fi network, Bluetooth (registered trademark), dedicated short range communication (DSRC), or the like.

The vehicle sensors 60 include, for example, a vehicle speed sensor that detects a vehicle speed, an acceleration sensor that detects an acceleration, a yaw rate sensor that detects an angular speed around a vertical axis, and a direction sensor that detects a direction of the subject vehicle M.

Figure 3:
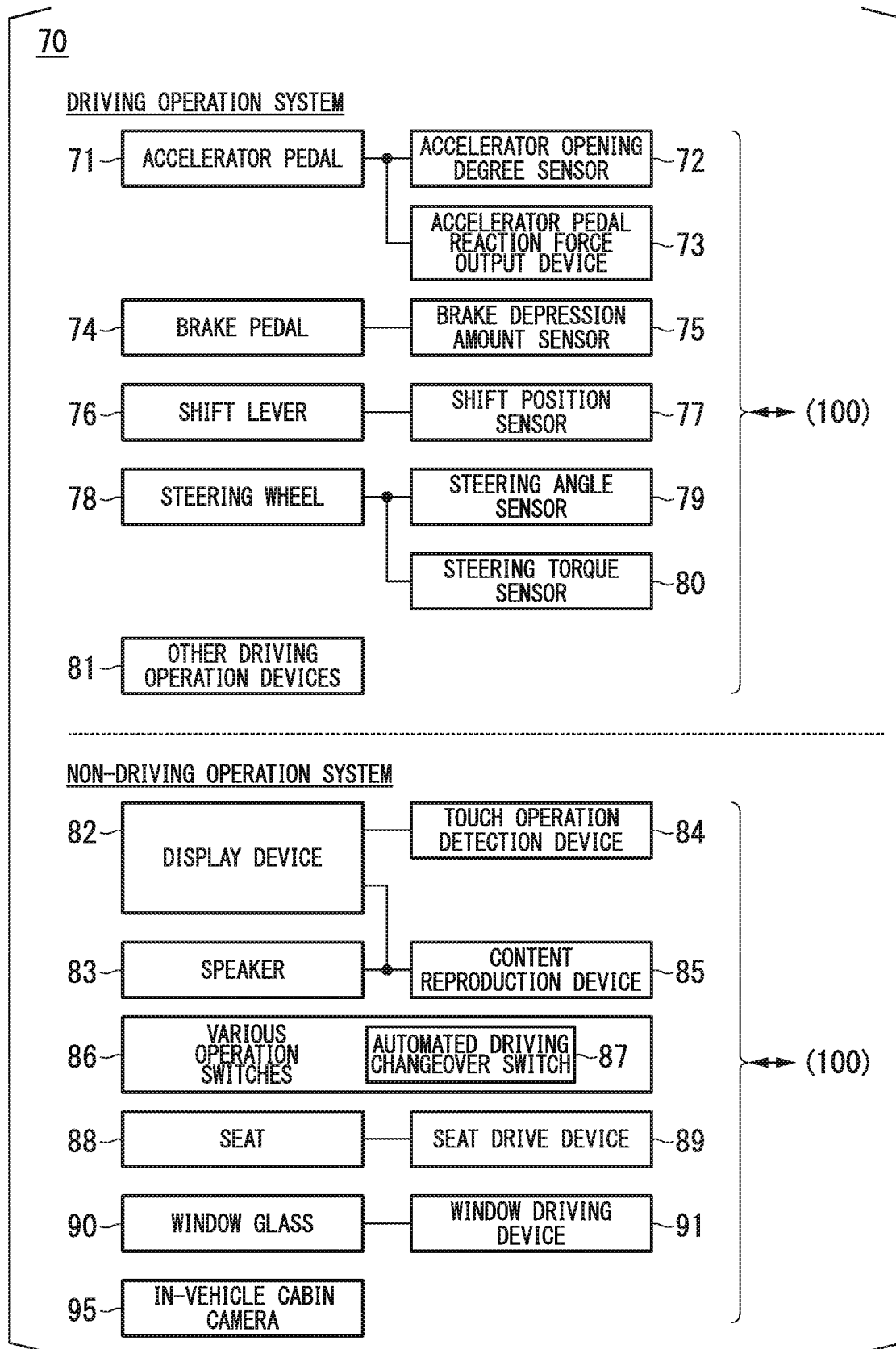
FIG. 3 is a configuration diagram of an HMI 70.

FIG. 3 is a configuration diagram of the HMI 70. The HMI 70 includes, for example, a configuration of a driving operation system and a configuration of a non-driving operation system. A boundary therebetween is not strictly defined, and the configuration of the driving operation system may have a function of the non-driving operation system (or vice versa). The driving operation system is an example of an operation reception unit that receives an operation of the vehicle occupant of the subject vehicle M.

The HMI 70 includes, for example, an accelerator pedal 71, an accelerator opening degree sensor 72, an accelerator pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81.

The accelerator pedal 71 is an operator for receiving an acceleration instruction from the vehicle occupant (or a deceleration instruction according to a return operation). The accelerator opening degree sensor 72 detects the amount of depression of the accelerator pedal 71 and outputs an accelerator opening degree signal indicating the amount of depression to the vehicle control system 100. It should be noted that the accelerator opening degree sensor 72 may directly output the accelerator opening degree signal to the travel driving force output device 200, the steering device 210, or the brake device 220 instead of outputting the accelerator opening degree signal to the vehicle control system 100. The same applies to configurations of other driving operation systems to be described below. The accelerator pedal reaction force output device 73 outputs a force (an operation reaction force) in a direction opposite to an operation direction to the accelerator pedal 71 in response to an instruction from the vehicle control system 100, for example.

The brake pedal 74 is an operator for receiving a deceleration instruction from the vehicle occupant. The brake depression amount sensor 75 detects the amount of depression (or a depression force) of the brake pedal 74 and outputs a brake signal indicating a detection result to the vehicle control system 100.

The shift lever 76 is an operator for receiving an instruction to change a shift stage from the vehicle occupant. The shift position sensor 77 detects a shift stage instructed by the vehicle occupant and outputs a shift position signal indicating a detection result to the vehicle control system 100.

The steering wheel 78 is an operator for receiving a turning instruction from the vehicle occupant. The steering angle sensor 79 detects a steering angle of the steering wheel 78 and outputs a steering angle signal indicating a detection result to the vehicle control system 100. The steering torque sensor 80 detects a torque applied to the steering wheel 78 and outputs a steering torque signal indicating a detection result to the vehicle control system 100. It should be noted that, as a control regarding the steering wheel 78, an operation reaction force may be output to the steering wheel 78, for example, by outputting a torque to a steering shaft using a reaction force motor or the like.

The other driving operation devices 81 are, for example, a joystick, a button, a dial switch, and a graphical user interface (GUI) switch. The other driving operation devices 81 receive an acceleration instruction, a deceleration instruction, a turning instruction and the like, and output the instructions to the vehicle control system 100.

The HMI 70 includes, for example, a display device (a display unit) 82, a speaker 83, a touch operation detection device 84, a content reproduction device 85, various operation switches 86, a seat 88, a seat driving device 89, a window glass 90, a window driving device 91, and an in-vehicle cabin camera 95.

The display device 82 is, for example, a liquid crystal display (LCD) or an organic electroluminescence (EL) display device attached to each unit of an instrument panel, or an arbitrary place facing a passenger seat or a rear seat. Further, the display device 82 may be a head up display (HUD) that projects an image to a front windshield or another window. The speaker 83 outputs sound. When the display device 82 is a touch panel, the touch operation detection device 84 detects a contact position (a touch position) on a display screen of the display device 82 and outputs the contact position to the vehicle control system 100. When the display device 82 is not a touch panel, the touch operation detection device 84 may be omitted.

Examples of the content reproduction device 85 include a digital versatile disc (DVD) reproduction device, a compact disc (CD) reproduction device, a television receiver, and various guidance image generation devices. Some or all of the display device 82, the speaker 83, the touch operation detection device 84, and the content reproduction device 85 may be configured in common with the navigation device 50.

The various operation switches 86 are disposed at arbitrary places inside a vehicle cabin. The various operation switches 86 include an automated driving changeover switch 87 for instructing start (or future start) and stop of automated driving. The automated driving changeover switch 87 may be any one of a graphical user interface (GUI) switch and a mechanical switch. Further, the various operation switches 86 may include a switch for driving the seat driving device 89 or the window driving device 91.

The seat 88 is a seat on which the vehicle occupant is seated. The seat driving device 89 freely drives a reclining angle, a position in a forward and backward direction, a yaw angle, or the like of the seat 88. The window glass 90 is provided, for example, in each door. The window driving device 91 drives the window glass 90 to open and close the window glass 90.

The in-vehicle cabin camera 95 is a digital camera using a solid-state imaging element such as a CCD or a CMOS. The in-vehicle cabin camera 95 is attached at a position at which at least a head of the vehicle occupant who performs a driving operation can be imaged, such as a rearview mirror, a steering boss portion, or the instrument panel. The camera 40, for example, periodically repeatedly images the vehicle occupant.

The driving force output device 200, the steering device 210, and the brake device 220 will be described before the vehicle control system 100 is described.

The travel driving force output device 200 outputs a travel driving force (torque) for causing the vehicle to travel to a driving wheel. The travel driving force output device 200, for example, includes an engine, a transmission, and an engine electronic control unit (ECU) that controls the engine in a case in which the subject vehicle M is a car using an internal combustion engine as a power source, includes a traveling motor and a motor ECU that controls the traveling motor in a case in which the subject vehicle M is an electric car using an electric motor as a power source, and includes an engine, a transmission, an engine ECU, a traveling motor, and a motor ECU in a case in which the subject vehicle M is a hybrid vehicle. In a case in which the travel driving force output device 200 includes only an engine, the engine ECU adjusts a throttle opening degree of the engine, a gear shift stage, and the like according to information input from a travel control unit 160 to be described below. Further, when the travel driving force output device 200 includes only the traveling motor, the motor ECU adjusts a duty ratio of a PWM signal to be given to the traveling motor according to the information input from the travel control unit 160. When the travel driving force output device 200 includes the engine and the traveling motor, the engine ECU and the motor ECU cooperate with each other to control the travel driving force according to the information input from the travel control unit 160.

The steering device 210 includes, for example, a steering ECU and an electric motor. The electric motor, for example, changes a direction of the steerable wheels by applying a force to a rack and pinion mechanism. The steering ECU drives the electric motor according to information input from the vehicle control system 100 or input information on the steering angle or the steering torque, to change directions of the steerable wheels.

The brake device 220 is, for example, an electric servo brake device including a brake caliper, a cylinder that transfers hydraulic pressure to the brake caliper, an electric motor that generates the hydraulic pressure in the cylinder, and a brake control unit. The brake control unit of the electric servo brake device controls the electric motor according to the information input from the travel control unit 160 so that a brake torque according to the braking operation is output to each wheel. The electric servo brake device may include, as a backup, a mechanism for transferring the hydraulic pressure generated by the operation of the brake pedal to the cylinder via a master cylinder. It should be noted that the brake device 220 is not limited to the electric servo brake device described above and may be an electronically controlled hydraulic brake device. The electronically controlled hydraulic brake device controls an actuator according to the information input from the travel control unit 160 and transfers the hydraulic pressure of the master cylinder to the cylinder. Further, the brake device 220 may include a regenerative brake using a traveling motor that may be included in the travel driving force output device 200.

[Vehicle Control System]

Hereinafter, the vehicle control system 100 will be described. The vehicle control system 100 is realized by, for example, one or more processors or hardware having equivalent functions. The vehicle control system 100 may have a configuration in which, for example, a processor such as a central processing unit (CPU), a storage device, an electronic control unit (ECU) having a communication interface connected by an internal bus, a micro-processing unit (MPU) are combined.

Referring back to FIG. 2, the vehicle control system 100 includes, for example, the target lane determination unit 110, an automated driving control unit 120, a travel control unit 160, an HMI control unit 170, and a storage unit 180. The automated driving control unit 120 includes, for example, an automated driving mode control unit 130, a subject-vehicle position recognition unit 140, an external environment recognition unit 142, an action plan generation unit 144, a trajectory generation unit 146, and a switching control unit 150. Some or all of each of the target lane determination unit 110, each unit of the automated driving control unit 120, the travel control unit 160, and the HMI control unit 170 are realized by the processor executing a program (software). Further, some or all of the units may be realized by hardware such as a large scale integration (LSI) or an application specific integrated circuit (ASIC) or may be realized in a combination of software and hardware.

Information such as high-precision map information 182, target lane information 184, and action plan information 186, for example, are stored in the storage unit 180. The storage unit 180 is realized by a read only memory (ROM), a random access memory (RAM), a hard disk drive (HDD), a flash memory, or the like. The program to be executed by the processor may be stored in the storage unit 180 in advance or may be downloaded from an external device via an in-vehicle Internet facility or the like. Further, the program may be installed in the storage unit 180 by a portable storage medium having the program stored therein being mounted on a driving device (not illustrated). Further, the vehicle control system 100 may be distributed by a plurality of computer devices.

The target lane determination unit 110 is realized by, for example, an MPU. The target lane determination unit 110 divides the route provided from the navigation device 50 into a plurality of blocks (for example, divides every 100 [m] in the vehicle traveling direction), and determines the target lane by referring to the high-precision map information 182. The target lane determination unit 110, for example, determines which of lanes from the left in which the subject vehicle travels. The target lane determination unit 110 determines, for example, the target lane so that the subject vehicle M can travel on a reasonable traveling route for traveling to a branch destination when a branch place or a merging place exists in the route. The target lane determined by the target lane determination unit 110 is stored in the storage unit 180 as the target lane information 184.

The high-precision map information 182 is map information with higher precision than that of the navigation map included in the navigation device 50. The high-precision map information 182 is, for example, information on a center of a lane or information on boundaries of a lane. The map information 182 may include road information, traffic regulations information, address information (address and postal code), facilities information, telephone number information, and the like. The road information includes information indicating types of road such as expressways, toll roads, national highways, and prefectural roads, or information such as the number of lanes on a road, a width of respective lanes, a gradient of a road, a position of a road (three-dimensional coordinates including a longitude, a latitude, and a height), a curvature of a curve of the lane, a position of a merging or branching point of the lane, and a sign provided on a road. The traffic regulation information includes information such as lane closures due to roadwork, traffic accidents, traffic jam, or the like.

The automated driving control unit 120 automatically controls at least one of acceleration/deceleration and steering of the subject vehicle M so that the subject vehicle M travels along a route to the destination.

The automated driving mode control unit 130 determines an automated driving mode to be executed by the automated driving control unit 120. The automated driving mode in the first embodiment includes the following modes. It should be noted that the following is merely an example, and the number of automated driving modes may be arbitrarily determined.

[First Mode]

A first mode is a mode in which a degree of automated driving is highest, as compared with other modes. When the first mode is performed, all vehicle controls such as complicated merging control are automatically performed, and therefore, the vehicle occupant does not have to monitor surroundings or a state of the subject vehicle M.

[Second Mode]

A second mode is a mode in which the degree of automated driving is next to the first mode. When the second mode is performed, all the controls of the vehicle is automatically performed as a general rule, but the driving operation of the subject vehicle M is entrusted to the vehicle occupant according to scenes. Therefore, it is necessary for the vehicle occupant to monitor the surroundings or state of the subject vehicle M.

[Third Mode]

A third mode is a mode in which the degree of automated driving is next to the second mode. When the third mode is performed, the vehicle occupant needs to perform a confirmation operation according to scenes with respect to the HMI 70. In the third mode, for example, the vehicle occupant is notified of a timing of a lane change, and when the vehicle occupant performs an operation for instructing to change the lane with respect to the HMI 70, automatic lane change is performed. Therefore, it is necessary for the vehicle occupant to monitor the surroundings or state of the subject vehicle M.

The automated driving mode control unit 130 determines the automated driving mode on the basis of an operation of the vehicle occupant with respect to the HMI 70, an event determined by the action plan generation unit 144, a traveling aspect determined by the trajectory generation unit 146, and the like. Further, the HMI control unit 170 is notified of the automated driving mode. Further, in the automated driving mode, a limit may be set according to the performance or the like of the detection device DD of the subject vehicle M. For example, when the performance of the detection device DD is low, the first mode may not be performed. In any of the modes, switching to the manual driving mode (override) can be performed according to an operation with respect to a configuration of a driving operation system in the HMI 70.

The subject-vehicle position recognition unit 140 of the automated driving control unit 120 recognizes a lane (traveling lane) in which the subject vehicle M is traveling, and a relative position of the subject vehicle M with respect to the traveling lane, on the basis of the high-precision map information 182 stored in the storage unit 180, and information input from the finder 20, the radar 30, the camera 40, the navigation device 50, or the vehicle sensor 60.

The subject-vehicle position recognition unit 140 compares, for example, a pattern of a road division line (for example, an arrangement of a solid line and a broken line) recognized from the high-precision map information 182 with a pattern of a road division line around the subject vehicle M recognized from an image captured by the camera 40 to recognize the traveling lane. In this recognition, the position of the subject vehicle M acquired from the navigation device 50 or a processing result by an INS may be added.

Figure 4:
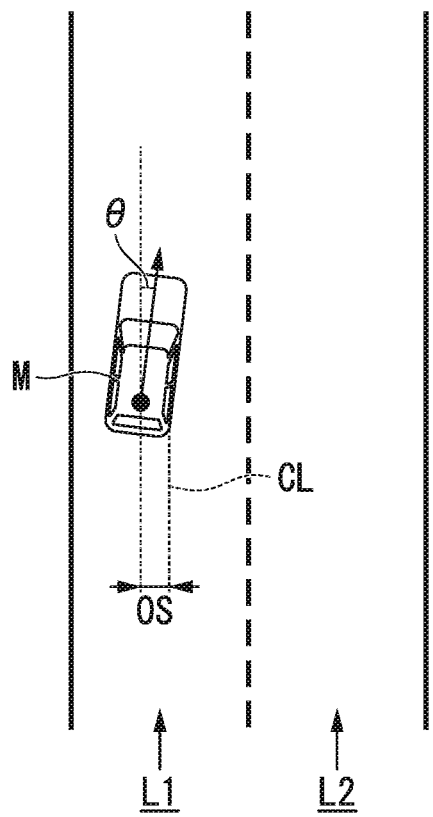
FIG. 4 is a diagram illustrating a state in which a relative position of a subject vehicle M with respect to a travel lane L1 is recognized by a subject-vehicle position recognition unit 140.

FIG. 4 is a diagram illustrating a state in which the relative position of the subject vehicle M with respect to the travel lane L1 is recognized by the subject-vehicle position recognition unit 140. The subject-vehicle position recognition unit 140, for example, may recognize a deviation OS of a reference point (for example, a centroid) of the subject vehicle M from a travel lane center CL, and an angle θ with respect to a connecting line along the travel lane center CL in the travel direction of the subject vehicle M, as the relative position of the subject vehicle M with respect to a travel lane L1. It should be noted that, instead of this, the subject-vehicle position recognition unit 140 may recognize, for example, the position of the reference point of the subject vehicle M with respect to any one side end portion of the subject lane L1 as the relative position of the subject vehicle M with respect to the travel lane. The relative position of the subject vehicle M recognized by the subject-vehicle position recognition unit 140 is provided to the action plan generation unit 144.

The external environment recognition unit 142 recognizes a state such as a position, a speed, and an acceleration of a nearby vehicle on the basis of information input from the finder 20, the radar 30, the camera 40, and the like. The nearby vehicle is, for example, a vehicle that is traveling nearby the subject vehicle M and is a vehicle that travels in the same direction as that of the subject vehicle M. The position of the nearby vehicle may be represented by a representative point such as a centroid or a corner of another vehicle or may be represented by an area represented by an outline of another vehicle. The "state" of the nearby vehicle may include an acceleration of the nearby vehicle, and an indication of whether or not the nearby vehicle is changing lane (or whether or not the nearby vehicle is about to change lane), which are recognized on the basis of the information of the various devices described above. Further, the external environment recognition unit 142 may also recognize a position of a guardrail, a utility pole, a parked vehicle, a pedestrian, and other objects, in addition to nearby vehicles.

The action plan generation unit 144 sets a starting point of automated driving and/or a destination for automated driving. The starting point of automated driving may be a current position of the subject vehicle M or may be a point at which an operation for instructing automated driving is performed. The action plan generation unit 144 generates the action plan in a section between the starting point and the destination of automated driving. It should be noted that the present invention is not limited thereto, and the action plan generation unit 144 may generate the action plan for any section.

The action plan includes, for example, a plurality of events that are executed sequentially. Examples of the events include a deceleration event for decelerating the subject vehicle M, an acceleration event for accelerating the subject vehicle M, a lane keeping event for causing the subject vehicle M to travel so that the subject vehicle M does not deviate from a travel lane, a lane change event for changing travel lane, an overtaking event for causing the subject vehicle M to overtake a preceding vehicle, a branching event for changing a lane to a desired lane at a branch point or causing the subject vehicle M to travel so that the subject vehicle M does not deviate from a current travel lane, a merging event for accelerating and decelerating the subject vehicle M at a merging lane for merging into a main lane and changing travel lane, and a handover event.

Here, the handover in the first embodiment includes a scheduled handover, a situation-adaptive handover, and an override-adaptable handover.

The scheduled handover is a handover that cause shift from the automated driving mode to the manual driving mode at a scheduled end point of the automated driving.

The situation-adaptive handover is a handover that causes shift to the manual driving mode according to an external environment situation such as a weather or a road being not suitable for automated driving in the automated driving mode. That is, the situation-adaptive handover is an example of a handover that switches the driving mode from the automated driving mode to the manual driving mode on the basis of the external environment situation. The external environment situation to be used for a determination as to whether or not the situation-adaptive handover is to be performed is recognized by the external environment recognition unit 142.

The override-adaptable handover is a handover that causes shift to the manual driving mode according to an operation with intention to drive having been performed by a vehicle occupant when the automated driving is being executed.

The action plan generation unit 144 sets a lane change event, a branching event, or a merging event at a place at which the target lane determined by the target lane determination unit 110 is switched. Information indicating the action plan generated by the action plan generation unit 144 is stored in the storage unit 180 as the action plan information 186.

Figure 5:
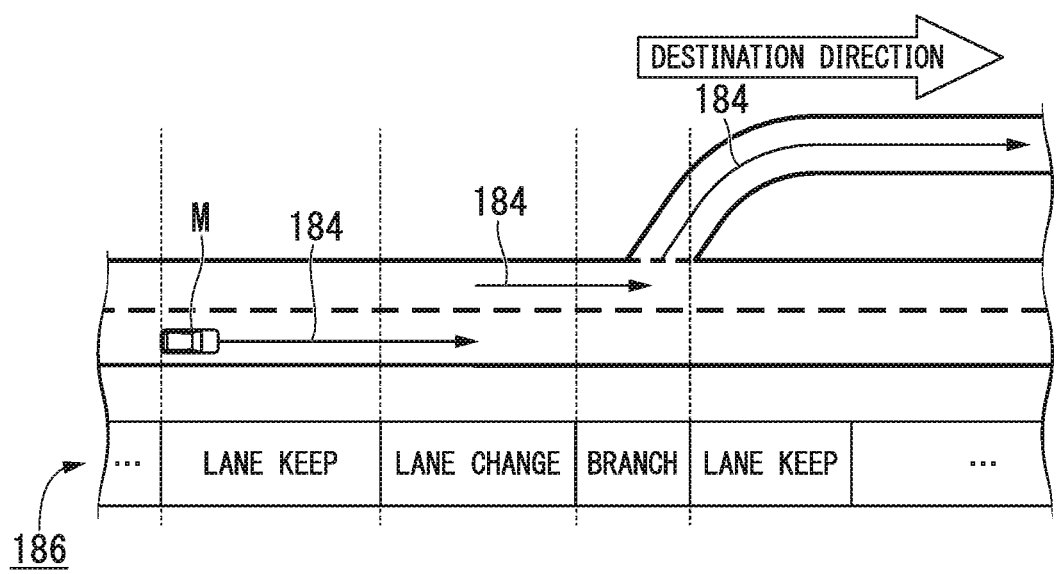
FIG. 5 is a diagram illustrating an example of an action plan generated for a certain section.

FIG. 5 is a diagram illustrating an example of an action plan generated for a certain section. As illustrated in FIG. 5, the action plan generation unit 144 generates an action plan necessary for the subject vehicle M to travel on the target lane indicated by the target lane information 184. It should be noted that the action plan generation unit 144 may dynamically change the action plan irrespective of the target lane information 184 according to a situation change of the subject vehicle M. For example, when a speed of the nearby vehicle recognized by the external environment recognition unit 142 exceeds a threshold value during vehicle traveling or a moving direction of the nearby vehicle traveling in the lane adjacent to the subject lane is directed to a direction of the subject lane, the action plan generation unit 144 may change an event set in a driving section in which the subject vehicle M is scheduled to travel. For example, in a case in which an event is set so that a lane change event is executed after a lane keeping event, when it has been found from a result of the recognition of the external environment recognition unit 142 that a vehicle travels at a speed equal to or higher than a threshold value from behind in a lane that is a lane change destination during the lane keeping event, the action plan generation unit 144 may change an event subsequent to the lane keeping event from a lane change event to a deceleration event, a lane keeping event, or the like. As a result, even when a change occurs in a state of the external environment, the vehicle control system 100 can cause the subject vehicle M to safely automatically travel.

Figure 6:
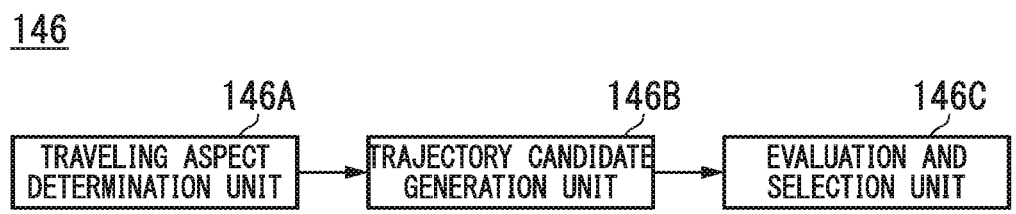
FIG. 6 is a diagram illustrating an example of a configuration of a trajectory generation unit 146.

FIG. 6 is a diagram illustrating an example of a configuration of the trajectory generation unit 146. The trajectory generation unit 146 includes, for example, a traveling aspect determination unit 146A, a trajectory candidate generation unit 146B, and an evaluation and selection unit 146C.

When a lane keeping event is executed, the traveling aspect determination unit 146A determines a traveling aspect of any one of constant speed traveling, following traveling, low speed following traveling, decelerating traveling, curved traveling, obstacle avoidance traveling, and the like. For example, when there are no other vehicles in front of the subject vehicle M, the traveling aspect determination unit 146A determines the traveling aspect to be constant speed traveling. Further, when the vehicle follows the preceding vehicle, the traveling aspect determination unit 146A determines the traveling aspect to be following traveling. Further, the traveling aspect determination unit 146A determines the traveling aspect to be the low speed follow traveling in a congested situation or the like. Further, when the external environment recognition unit 142 recognizes deceleration of the preceding vehicle or when an event such as stopping or parking is performed, the traveling aspect determination unit 146A determines the traveling aspect to be decelerating traveling. Further, when the external environment recognition unit 142 recognizes that the subject vehicle M has arrived at a curved road, the traveling aspect determination unit 146A determines the traveling aspect to be curved traveling. Further, when an obstacle is recognized in front of the subject vehicle M by the external environment recognition unit 142, the traveling aspect determination unit 146A determines the traveling aspect to be the obstacle avoidance traveling. Further, when the lane change event, the overtaking event, the branching event, the merging event, the handover event, or the like is performed, the traveling aspect determination unit 146A determines the traveling aspect according to each event.

Figure 7:
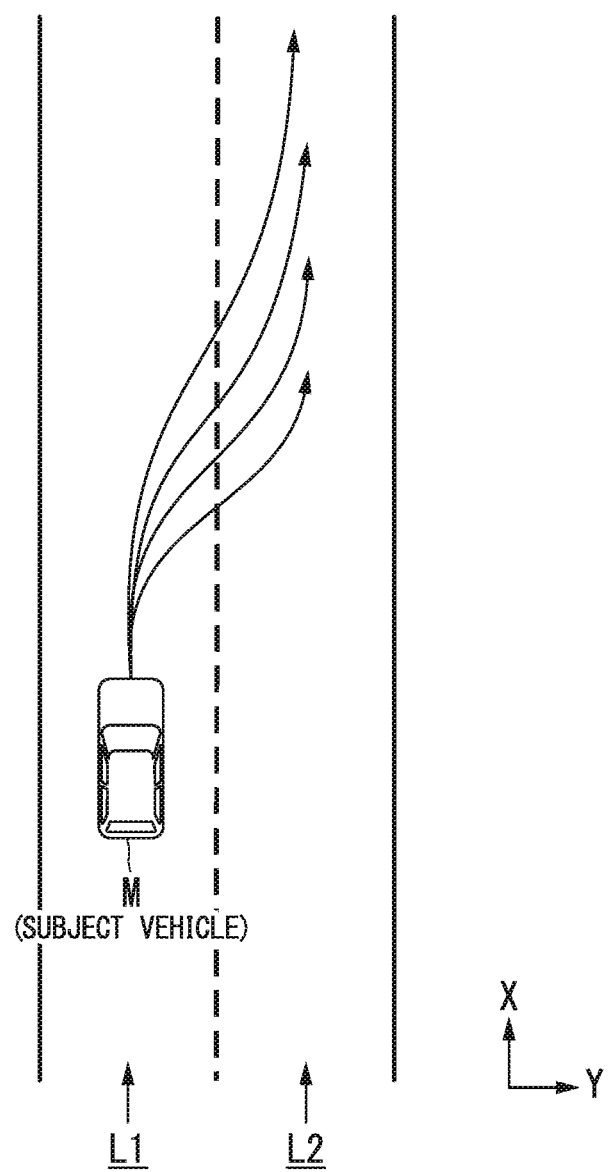
FIG. 7 is a diagram illustrating an example of a candidate for a trajectory that is generated by a trajectory candidate generation unit 146B.

The trajectory candidate generation unit 146B generates candidates for the trajectory on the basis of the traveling aspect determined by the traveling aspect determination unit 146A. FIG. 7 is a diagram illustrating an example of candidates for the trajectory generated by the trajectory candidate generation unit 146B. FIG. 7 illustrates candidates for the trajectory generated when the subject vehicle M changes the lane from the lane L1 to the lane L2.

Figure 8:
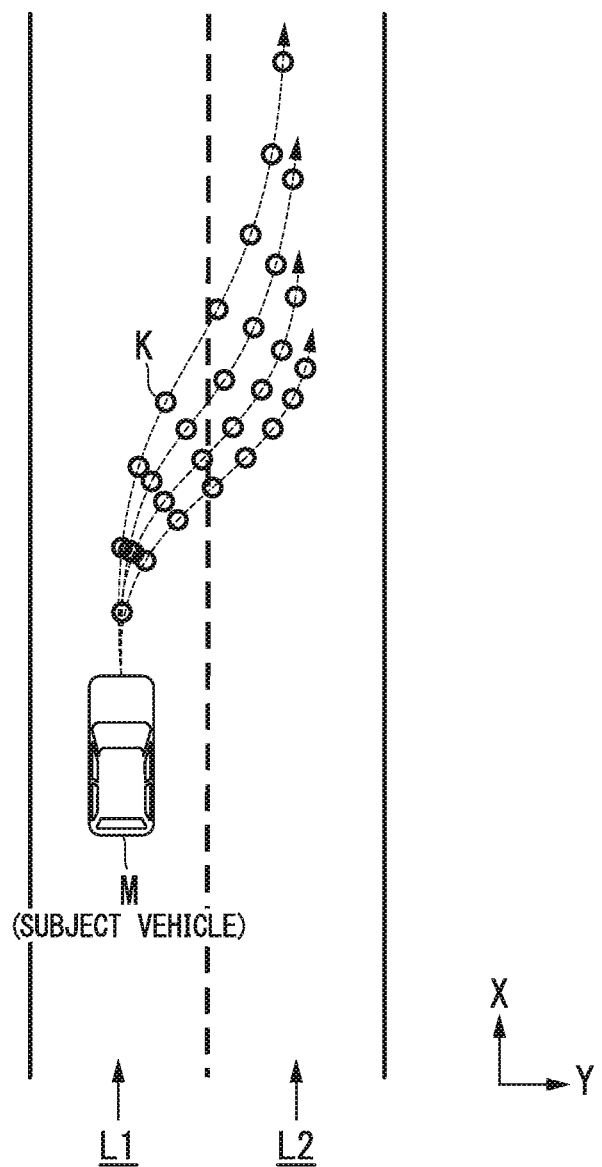
FIG. 8 is a diagram in which the candidate for the trajectory generated by the trajectory candidate generation unit 146B is represented by the trajectory points K.

The trajectory candidate generation unit 146B determines the trajectory as illustrated in FIG. 7, for example, to be a collection of the target positions (the trajectory points K) that the reference position (for example, a centroid or a rear wheel shaft center) of the subject vehicle M should reach at every predetermined time in the future. FIG. 8 is a diagram in which the candidate for the trajectory generated by the trajectory candidate generation unit 146B is represented by the trajectory points K. When an interval between the trajectory points K is wider, the speed of the subject vehicle M becomes higher, and when the interval between the trajectory points K is narrower, the speed of the subject vehicle M becomes lower. Therefore, the trajectory candidate generation unit 146B gradually widens the interval between the trajectory points K when acceleration is desired, and gradually narrows the interval between the trajectory points when deceleration is desired.

Thus, since the trajectory point K includes a speed component, the trajectory candidate generation unit 146B needs to give a target speed to each trajectory point K. The target speed is determined according to the traveling aspect determined by the traveling aspect determination unit 146A.

A scheme of determining the target speed when lane change (including branching) is changed will be described herein. The trajectory candidate generation unit 146B first sets a lane changing target position (or a merging target position). The lane changing target position is set as a relative position with respect to the nearby vehicle and is used for a determination as to "whether the lane change is performed between the subject vehicle and a certain nearby vehicle". The trajectory candidate generation unit 146B determines the target speed when the lane change is performed while focusing on three nearby vehicles with reference to the lane changing target position.

Figure 9:
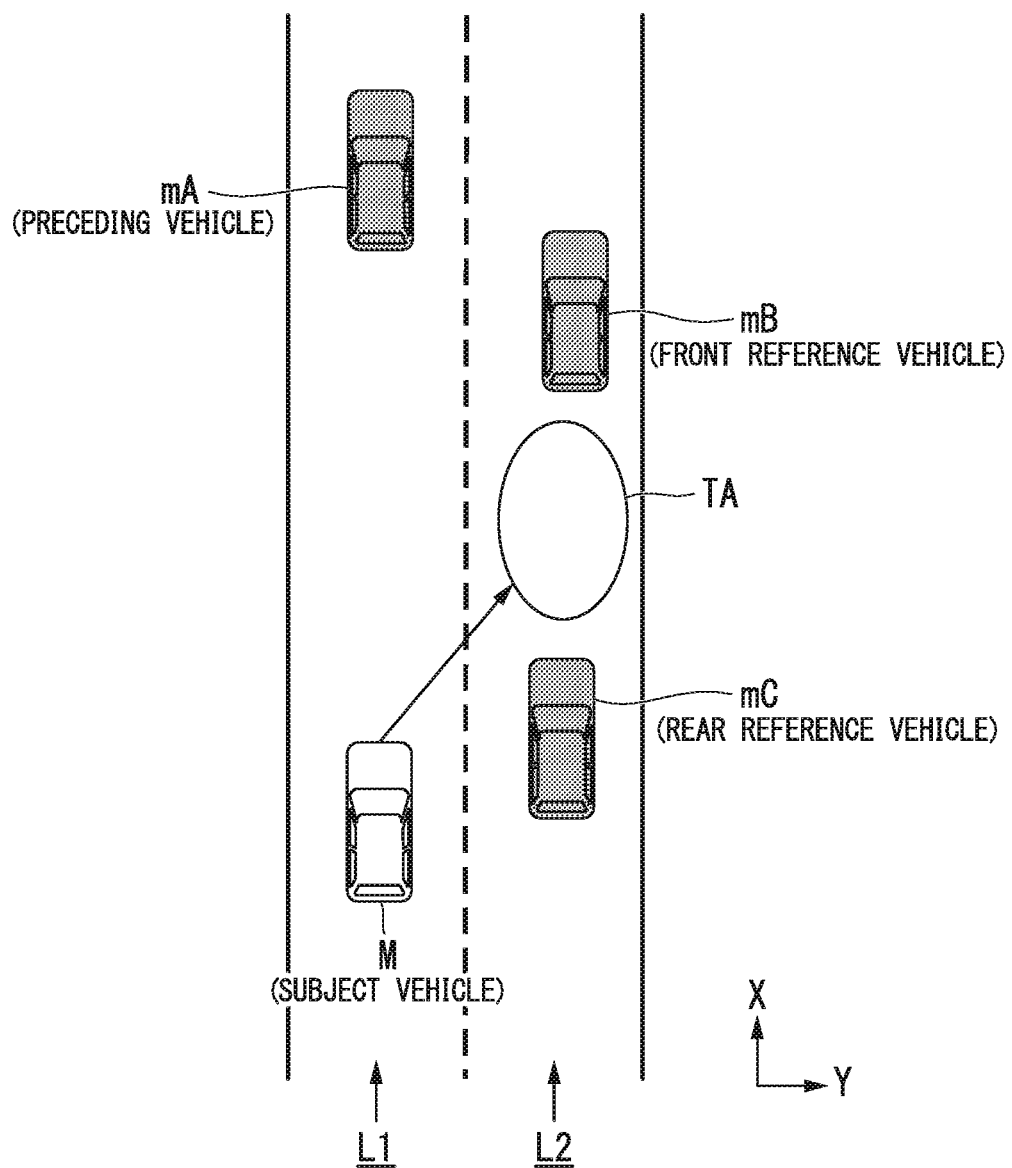
FIG. 9 is a diagram illustrating a lane changing target position TA.

FIG. 9 is a diagram illustrating the lane changing target position TA. In FIG. 9, L1 indicates the subject lane, and L2 indicates an adjacent lane. Here, a nearby vehicle traveling in front of the subject vehicle M on the same lane as that of the subject vehicle M is referred to as a preceding vehicle mA, a nearby vehicle traveling immediately before the lane changing target position TA is referred to as a front reference vehicle mB, and a nearby vehicle traveling immediately after the lane changing target position TA is referred to as a rear reference vehicle mC. The subject vehicle M needs to perform acceleration or deceleration in order to move to the side of the lane changing target position TA, but should avoid catching up with the preceding vehicle mA in this case. Therefore, the trajectory candidate generation unit 146B predicts a future state of the three nearby vehicles and determines a target speed so that the subject vehicle M does not interfere with each nearby vehicle.

Figure 10:
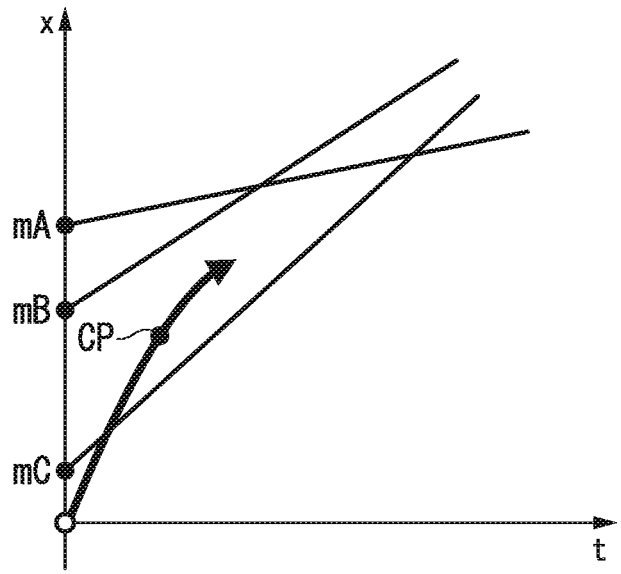
FIG. 10 is a diagram illustrating a speed generation model when speeds of three nearby vehicles are assumed to be constant.

FIG. 10 is a diagram illustrating a speed generation model when speeds of three nearby vehicles are assumed to be constant. In FIG. 10, straight lines extending from mA, mB, and mC indicate displacements in the traveling direction when each nearby vehicle is assumed to travel at a constant speed. The subject vehicle M should be between the front reference vehicle mB and the rear reference vehicle mC at a point CP at which the lane change is completed and should be behind the preceding vehicle mA before that. Under such restrictions, the trajectory candidate generation unit 146B derives a plurality of time-series patterns of the target speed until the lane change is completed. The trajectory candidate generation unit 146B derives a plurality of trajectory candidates as illustrated in FIG. 8 described above by applying the time-series patterns of the target speed to a model such as a spline curve. It should be noted that a motion pattern of the three nearby vehicles is not limited to the constant speed as illustrated in FIG. 10, but the prediction may be performed on the premise of constant acceleration and constant jerk.

The evaluation and selection unit 146C performs evaluation on the trajectory candidates generated by the trajectory candidate generation unit 146B, for example, from two viewpoints including planning and safety, and selects a trajectory to be output to the travel control unit 160. From the viewpoint of the planning, for example, when follow-up with respect to an already generated plan (for example, the action plan) is high and a total length of the trajectory is short, the trajectory obtains high evaluation. For example, a trajectory in which the lane is changed to the left direction and then returning is required when the lane is desired to be changed to the right obtains a low evaluation. From the viewpoint of the safety, for example, a distance between the subject vehicle M and an object (a nearby vehicle or the like) is longer at each trajectory point and the amount of change in acceleration and deceleration or steering angle is smaller, high evaluation is obtained.

The switching control unit 150 switches the driving mode between the automated driving mode and the manual driving mode on the basis of the signal input from the automated driving changeover switch 87. Further, the switching control unit 150 performs overriding to switch the driving mode from the automated driving mode to the manual driving mode on the basis of an operation from the vehicle occupant.

First Embodiment

As described above, in a first embodiment, situation-adaptive handover is performed as one of handover. The situation-adaptive handover is a handover causing shift from the automated driving mode to the manual driving mode in response to an external environment situation becoming a point not suitable for continuation of the automated driving under a state in which the automated driving is being performed.

As described above, the situation-adaptive handover is not scheduled in advance, but is performed according to the situation of the external environment. Therefore, for the vehicle occupant, switching from the automated driving mode to the manual driving mode is likely to unexpectedly occur according to the situation-adaptive handover. In this case, for example, when the mode is switched to the manual driving mode, the user may be unable to drive immediately in correspondence with the manual driving mode.

Therefore, the vehicle control system 100 according to the first embodiment is configured to predict a possibility of occurrence of the situation-adaptive handover at a point of the traveling destination using a configuration to be described below and output a handover preparation notification (an example of information for prompting preparation for handover) to the vehicle occupant when the vehicle control system 100 predicts that the situation-adaptive handover occurs. The handover preparation notification is a notification for prompting the vehicle occupant to take a body posture in which manual driving can be sufficiently performed from now in preparation for the occurrence of the situation-adaptive handover since the possibility of occurrence of switching to the manual driving mode according to the situation-adaptive handover is high at a previous point. The handover preparation notification is performed, for example, using voice. Further, a display of handover preparation notification may also be used together.

For the above handover preparation notification, the automated driving control unit 120 in the first embodiment includes a handover prediction unit 155. The handover prediction unit 155 predicts the possibility of occurrence of the handover. In the first embodiment, the handover prediction unit 155 predicts the possibility of occurrence of the handover on the basis of the change in the external environment situation recognized by the external environment recognition unit 142.

Figure 11:
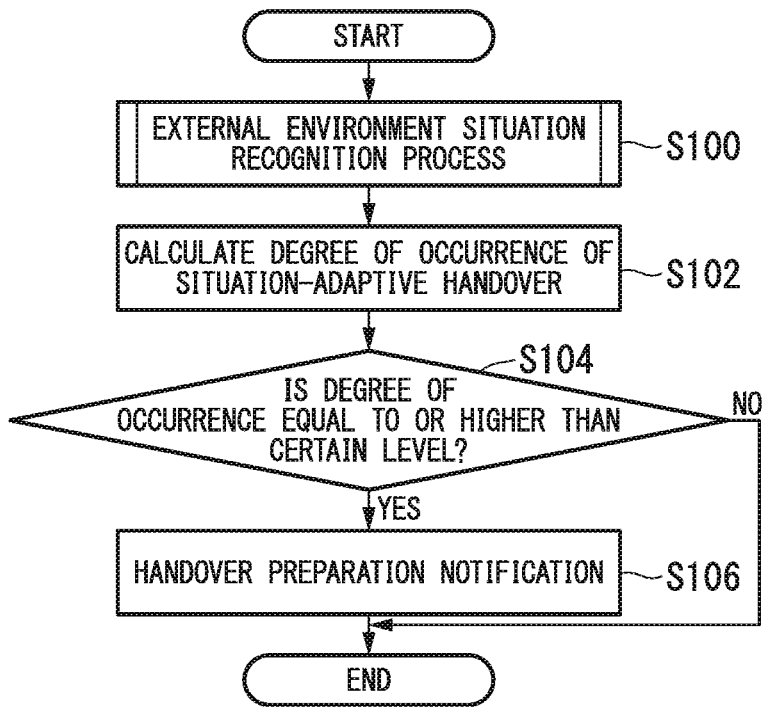
FIG. 11 is a flowchart showing an example of a process procedure that the vehicle control system 100 according to the first embodiment executes in connection with output of a handover preparation notification.

A flowchart of FIG. 11 shows an example of a process procedure that the vehicle control system 100 according to the first embodiment executes in connection with the output of the handover preparation notification. The process of FIG. 11 is repeatedly executed at every certain time while the automated driving in the automated driving mode is being executed. The external environment recognition unit 142 executes an external environment situation recognition process corresponding to prediction of occurrence of the situation-adaptive handover (step S100).

Figure 12:
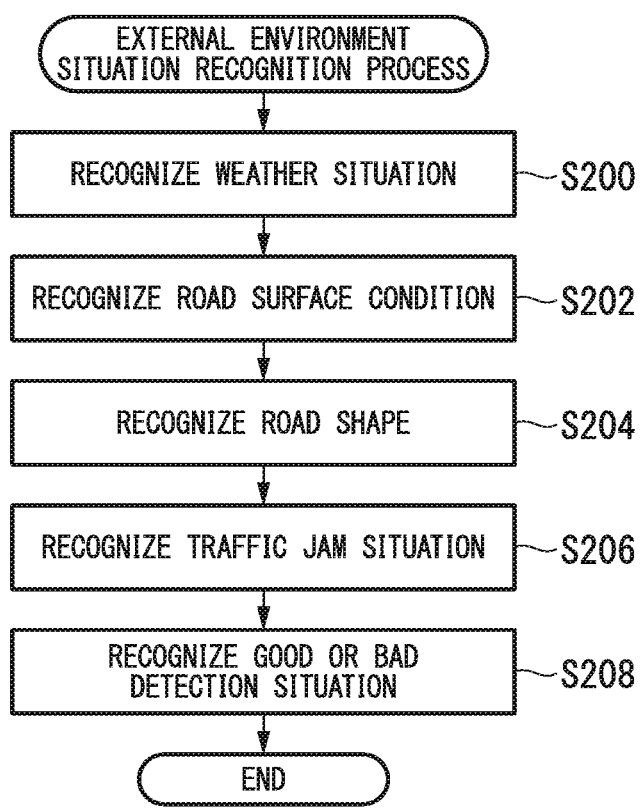
FIG. 12 is a flowchart showing an example of a process procedure for an external environment situation recognition process that is executed by the vehicle control system 100 according to the first embodiment.

The flowchart of FIG. 12 illustrates an example of a process procedure of the external environment situation recognition process as step S100 of FIG. 11.

The external environment recognition unit 142 recognizes a weather situation as one external environment situation (step S200). Specifically, the external environment recognition unit 142 can estimate a weather corresponding to a current position using information on weather forecast to be received via the communication device 55. Further, when the detection device DD includes, for example, a rain sensor, the external environment recognition unit 142 can recognize a rainfall situation on the basis of a detection output of the rain sensor. The rain sensor is, for example, a sensor that is provided so that raindrops can be detected with respect to the subject vehicle M. Further, the external environment recognition unit 142 can estimate the weather corresponding to the current position on the basis of measured values of a hygrometer included in the detection device DD, a thermometer that measures a temperature of the outside air, or the like.

Further, the external environment recognition unit 142 recognizes a road surface situation as one external environment situation (step S202). The external environment recognition unit 142 recognizes, for example, a degree of unevenness on a road surface of the road on which the subject vehicle M travels as the road surface situation. The external environment recognition unit 142 can extract a component corresponding to the unevenness of the road surface from a signal output by the acceleration sensor included in the vehicle sensor 60 and analyze the extracted components of the signal to recognize the road surface situation.

Further, the external environment recognition unit 142 recognizes a road shape as one external environment situation (step S204). The external environment recognition unit 142 recognizes a curvature of the road on which the subject vehicle M travels as the road shape. The external environment recognition unit 142 can recognize the curvature of the road on which the subject vehicle M travels using the high-precision map information 182, for example. Further, the external environment recognition unit 142 may recognize, for example, a gradient of the road as the road shape.

Further, the external environment recognition unit 142 recognizes a traffic jam situation as one external environment situation (step S206). The external environment recognition unit 142 recognizes a traffic jam situation in the traveling route scheduled under the currently executed automated driving, for example. The external environment recognition unit 142 can recognize the traffic jam situation using traffic information received via the communication device 55, for example.

Further, the external environment recognition unit 142 recognizes whether or not a detection situation regarding automated driving using the detection device DD is good as one external environment situation (step S208). Here, a good or bad detection situation indicates whether or not the detection result is normally obtained in correspondence with automated driving, for example, for the detection device DD. For example, when rain is strong or snow is accumulated, a state in which the detection of the lane based on the captured image of the camera 40 included in the detection device DD cannot be performed is entered. That is, the external environment recognition unit 142 can recognize whether or not the lane is normally detected as the good or bad detection situation.

Further, the external environment recognition unit 142 may recognize a situation in which the normal detection cannot be performed due to a failure of the detection device or the like as the good or bad detection situation.

It should be noted that, in FIG. 12, the external environment situation is recognized in the order of the weather situation, the road surface situation, the road shape, the traffic jam situation, and the good or bad detection situation, but the recognition order of the external environment situations is not particularly limited. Further, the external environment recognition unit 142 may concurrently recognize the external environment situations.

Referring back to FIG. 11 for description. The handover prediction unit 155 calculates a level (a degree of occurrence of situation-adaptive handover) at which the situation-adaptive handover occurs at a previous point in the traveling route, on the basis of the recognition result of the external environment situation in step S100 (step S102).

A method of calculating the degree of occurrence of situation-adaptive handover in the handover prediction unit 155 is not particularly limited.

As an example, the handover prediction unit 155 sets a weighting value according to the external environment situations recognized in steps S200 to S208 in FIG. 12. For example, when the weather situation recognized as the external environment situation are sunny, the weighting value is small. On the other hand, when the recognized weather situation is rain, snow, or the like, the weighting value corresponding to the weather situation increases.

When the recognized amount of rainfall or snowfall increases, the weighting value corresponding to the weather situation increases.

Further, for example, when the value indicating the degree of the unevenness serving as the road surface situation recognized as the external environment situation increases, the weighting value corresponding to the road surface situation increases.

Further, for example, as the road shape recognized with regard to the external environment situation, when a curvature of the road in a previous traveling route is small and the number of curves increases, a weighting value corresponding to the road situation is greater.

Further, for example, as the traffic jam situation recognized with regard to the external environment situation, when a degree of traffic jam in a previous traveling route is higher and as the congested distance is longer, a weighting value corresponding to the traffic jam situation becomes greater.

Further, as the detection situation recognized with regard to the external environment situation, for example, when a frequency of occurrence of a state in which a detection target such as a lane cannot normally be detected becomes higher, a weighting value corresponding to the detection situation becomes greater.

The handover prediction unit 155 multiplies a reference value set in each external environment situation by the weighting value serving as a coefficient to calculate a score of each external environment situation. For each external environment situation, a higher score indicates a situation not suitable for automated driving.

The handover prediction unit 155 calculates, for example, a total score obtained by summing the scores calculated for the respective external environment situations. A higher total score indicates an external environment situation not suitable for automated driving. The handover prediction unit 155 sets the total score calculated in this way as the degree of occurrence of the situation-adaptive handover.

It should be noted that the handover prediction unit 155 also specifies a point on the traveling route corresponding to the degree of occurrence of the situation-adaptive handover in calculating the degree of occurrence of the situation-adaptive handover in step S102.

The handover prediction unit 155 determines whether or not the degree of occurrence of the situation-adaptive handover calculated in step S102 is equal to or greater than a certain value (step S104). Therefore, the handover prediction unit 155 may compare the degree of occurrence of the situation-adaptive handover with a predetermined threshold value.

When the degree of occurrence of the situation-adaptive handover is equal to or greater than the certain value, the HMI control unit 170 (an example of an interface control unit) performs a handover preparation notification (step S106).

The HMI control unit 170 performs control, for example, so that a voice as the handover preparation notification is output from the speaker 83 in the HMI 70 (an example of the output unit). Further, the HMI control unit 170 may allow a message serving as the handover preparation notification to be displayed by a character, an image, or the like in the display device 82 (an example of an output unit) in the HMI 70, a display unit (an example of the output unit) of the navigation device 50, or the like, together with the handover preparation notification using the voice.

Further, the vehicle occupant may be notified of a point at which there is a possibility of the situation-adaptive handover occurring (a handover predicted point) through voice or an image at the time of the handover preparation notification. In the case of the voice, the vehicle occupant may be notified of a distance from the current position to the handover predicted point. Further, in the case of the image, a display indicating the handover predicted point may be performed on the navigation map.

On the other hand, when the degree of occurrence of the situation-adaptive handover is smaller than the certain value, step S106 is skipped and the process in FIG. 11 ends. In this case, the handover preparation notification is not performed.

Second Embodiment

Next, a second embodiment will be described. The handover preparation notification is output in response to a situation in which the possibility of occurrence of the situation-adaptive handover is high, as in the first embodiment, such that the vehicle occupant can prepare for taking a body posture in which the vehicle occupant can perform manual driving until the situation-adaptive handover occurs, at a timing at which the handover preparation notification is to be performed.

However, it is considered that there are many cases in which the vehicle occupant is trying to perform manual driving and a state in which the vehicle occupant can perform the manual driving is entered when the handover preparation notification is performed. Under such a situation, for example, the vehicle occupant is likely to feel troublesome for the handover preparation notification, and it can be considered that there is no need to intentionally perform the handover preparation notification.

Therefore, the vehicle control system 100 according to the second embodiment determines whether or not a state in which the manual driving can be performed is entered for a vehicle occupant who is going to perform the manual driving according to occurrence of the handover at a timing when the handover preparation notification is to be performed. The vehicle control system 100 performs the handover preparation notification when a state in which manual driving can be performed is not entered and does not perform the handover preparation notification when a state in which manual driving can be performed is entered.

Figure 13:
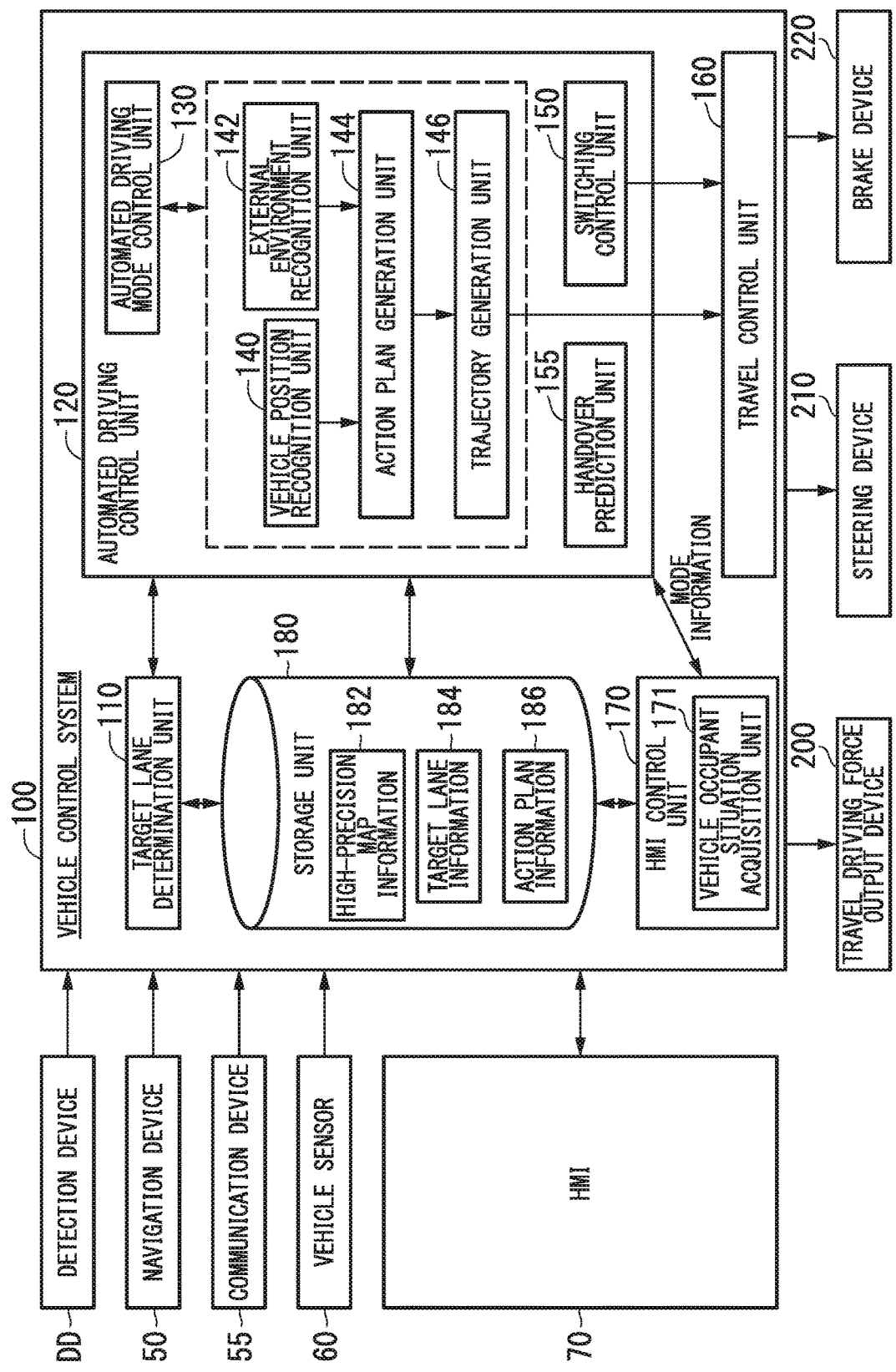
FIG. 13 is a functional configuration diagram centered on a vehicle control system 100 according to the second embodiment.

FIG. 13 shows an example of a configuration of the vehicle control system 100 according to the second embodiment. In FIG. 13, the same parts as those in FIG. 2 are denoted by the same reference numerals and description thereof is omitted.

The vehicle control system 100 of the second embodiment includes a vehicle occupant situation acquisition unit 171 in the HMI control unit 170. The vehicle occupant situation acquisition unit 171 acquires a situation of the vehicle occupant inside a vehicle who performs a driving operation when manual driving is executed.

Figure 14:
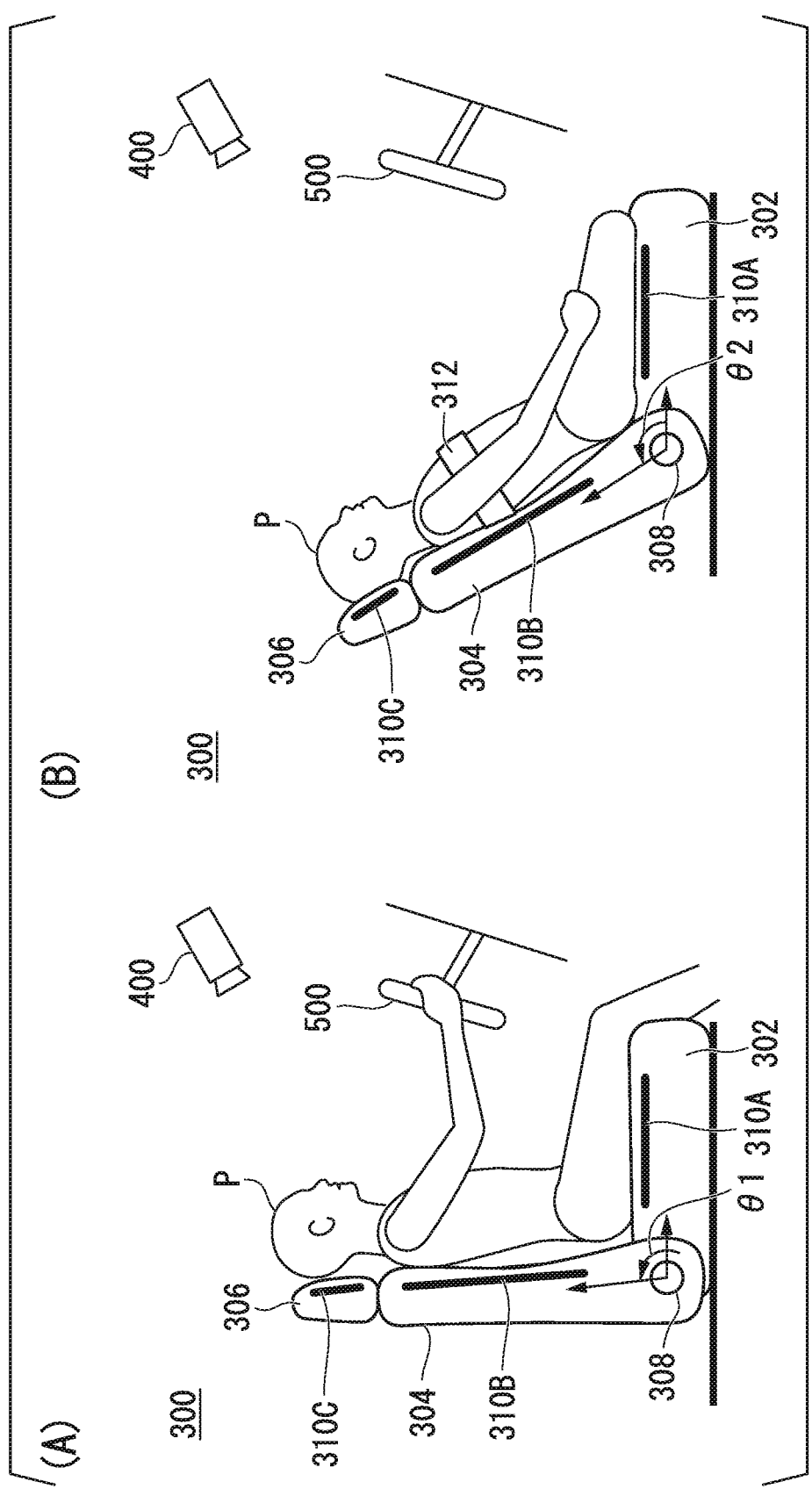
FIG. 14 is a diagram illustrating a specific example of a vehicle occupant situation that is acquired by a vehicle occupant situation acquisition unit 171 according to the second embodiment.

A specific example of the vehicle occupant situation acquired by the vehicle occupant situation acquisition unit 171 will be described with reference to FIG. 14. FIG. 14 illustrates an example of the state of the vehicle occupant within the subject vehicle M.

FIGS. 14(A) and 14(B) illustrate a seat 300 on which the vehicle occupant sits. The seat 300 is an example of a seat 88 in the HMI 70. In the example of FIG. 14, the seat 300 includes a seat portion (seat cushion) 302, a backrest portion (seat back) 304, a headrest 306, a reclining adjustment unit 308, a load sensor 310, and a fixing unit 312. The reclining adjustment unit 308 has a mechanism for adjusting an angle (a reclining angle) formed by the seat portion 302 and the backrest portion 304. The reclining adjustment unit 308 can acquire an information on the above-described angle. The load sensor 310 measures a load on the seat 300. In the examples of FIGS. 14(A) and 14(B), the load sensor 310 includes a load sensor 310A for the seat portion 302, a load sensor 310B for the backrest portion 304, and a load sensor 310C for the headrest 306, but the present invention is not limited thereto. Each of the load sensors 310A to 310C may be, for example, a plate-like sensor or may be a sensor in which a plurality of sensors are arranged at regular intervals.

For example, when the subject vehicle M performs, for example, automated driving, the fixing unit 312 fixes the posture of the vehicle occupant P when the vehicle occupant P is sitting cross-legged as illustrated in FIG. 14(B). The fixing unit 312 may be, for example, a belt-like unit pulled out from the backrest portion 304 or may be a movable member provided on the side surface of the backrest portion 304. The fixing unit 312, for example, may be a unit for fixing sides of the vehicle occupant P as illustrated in FIG. 14(B) or may be a unit (for example, a protruding member) for fixing the occupant's waist or the vicinity of the crotch.

Further, the subject vehicle M includes an in-vehicle cabin camera (an imaging unit) 400 that images a space inside the subject vehicle M. The above-described reclining adjustment unit 308, the load sensor 310, and the in-vehicle cabin camera 400 are examples of the HMI 70 described above. The vehicle occupant situation acquisition unit 171 acquires the vehicle occupant situation from the information obtained from at least one of the reclining adjustment unit 308, the load sensor 310, and the in-vehicle cabin camera 400. The vehicle occupant situation acquisition unit 171 determines whether or not the vehicle occupant is currently ready for manual driving (manual driving preparation state) on the basis of the acquired vehicle occupant situation.

For example, the vehicle occupant situation acquisition unit 171 can acquire the reclining angle θ acquired from the reclining adjustment unit 308 as one vehicle occupant situation, and use the reclining angle θ for a determination as to whether or not the driving preparation state is entered. That is, when the reclining angle θ acquired from the reclining adjustment unit 308 is equal to or larger than a predetermined angle (the backrest portion 304 is inclined by a predetermined angle or more), the vehicle occupant situation acquisition unit 171 determines that the manual driving preparation state is not entered. On the other hand, when the reclining angle θ is equal to or smaller than the predetermined value, the vehicle occupant situation acquisition unit 171 determines that the manual driving preparation state is entered.

In the example of FIG. 14(A), when a reclining angle θ1 is smaller than a predetermined value θs, the vehicle occupant situation acquisition unit 171 determines that the manual driving preparation state of the vehicle occupant P is entered. On the other hand, as illustrated in FIG. 14(B), when a reclining angle θ2 is larger than the predetermined value θs, the vehicle occupant situation acquisition unit 171 determines that the manual driving preparation state of the vehicle occupant P is not entered.

Further, the vehicle occupant situation acquisition unit 171 can acquires a load distribution of each of the load sensors 310A to 310C as one vehicle occupant situation and use the load distribution for a determination as to whether or not the driving preparation state is entered. It should be noted that in the following description, the load sensors 310A to 310C are referred to as a load sensor 310 unless distinguished from each other.

For example, as illustrated in FIG. 14(A), when the vehicle occupant P can grasp a steering wheel 500, the load of the load sensor 310A is high and the loads of the load sensors 310B and 310C are low. On the other hand, as illustrated in FIG. 14(B), when the backrest portion 304 of the seat 300 is inclined, the load of the load sensors 310B and 310C due to the vehicle occupant P increases. Therefore, the vehicle occupant situation acquisition unit 171 can determine whether or not the manual driving preparation state of the vehicle occupant P is entered on the basis of the respective load distributions acquired from the respective load sensors 310A to 310C.

For example, the vehicle occupant situation acquisition unit 171 can determine that the driving preparation state of the vehicle occupant P is not entered since the vehicle occupant P is leaning on the backrest portion 304 or the headrest 306, as illustrated in FIG. 14(B) when a difference between the loads obtained by the respective load sensors 310A to 310C is smaller than a predetermined value. Further, the vehicle occupant situation acquisition unit 171 determines that the driving preparation state is entered since the vehicle occupant P can immediately grasp the steering wheel 500 and start driving when the load difference between the load sensors 310A to 310C is greater than the predetermined value, as illustrated in FIG. 14(A).

Further, in the second embodiment, the vehicle occupant situation acquisition unit 171 can acquire the vehicle occupant situation on the basis of the captured image obtained by the above-described in-vehicle cabin camera 400 imaging the vehicle occupant P and use the vehicle occupant situation for the determination as to whether or not the driving preparation state of the vehicle occupant P is entered.

For example, the vehicle occupant situation acquisition unit 171 can acquire the state regarding visual inspection (visual state) such as an action of opening/closing eyes or the direction of the occupant's line of sight, as the vehicle occupant situation using feature information such as the motion of the body or eyes of the vehicle occupant P, and luminance or a shape with reference to an outline of a face, on the basis of the captured image of the in-vehicle cabin camera 400. The vehicle occupant situation acquisition unit 171 acquires the acquired visual state as one vehicle occupant situation.

The vehicle occupant situation acquisition unit 171 determines that the vehicle occupant P is asleep and the driving preparation state of the vehicle occupant P is not entered when a state in which the eyes of the vehicle occupant P are closed is maintained for a predetermined time or more, on the basis of the acquired visual state. On the other hand, the vehicle occupant situation acquisition unit 171 determines that the driving preparation state of the vehicle occupant P is entered when the occupant's line of sight is directed to the outside of the subject vehicle M (for example, the traveling direction of the subject vehicle) or when the occupant's eyes are open, on the basis of the acquired visual state.

Further, the vehicle occupant situation acquisition unit 171 may estimate the posture of the vehicle occupant P, for example, through shape matching between a contour shape of the vehicle occupant P included in a captured image captured by the in-vehicle cabin camera 400 and a preset contour shape and acquire a result of the estimation as the vehicle occupant situation. For example, when the vehicle occupant situation acquisition unit 171 estimates that the vehicle occupant P is sitting cross-legged or is leaning on the steering wheel 500 as a result of the posture estimation, the vehicle occupant situation acquisition unit 171 can determine that the driving preparation state of the vehicle occupant P is not entered.

Further, the vehicle occupant situation acquisition unit 171 may acquire the result of estimating whether or not the fixing unit 312 is being used by the vehicle occupant P as the vehicle occupant situation on the basis of the image captured by the in-vehicle cabin camera 400.

When it is estimated that the fixing unit 312 is being used, the vehicle occupant situation acquisition unit 171 determines that the vehicle occupant P is asleep or is in a rest state and the driving preparation state of the vehicle occupant P is not entered.

It should be noted that a sensor that detects that the vehicle occupant P fixes the posture using the fixing unit 312 may be provided in the fixing unit 312. When the vehicle occupant situation acquisition unit 171 detects that the fixing unit 312 is being used using the above sensor, it is possible to determine that the driving preparation state of the vehicle occupant P is not entered.

The vehicle occupant situation acquisition unit 171 of the second embodiment may determine whether or not the driving preparation state is entered using any one of the five vehicle occupant situations of the reclining angle, the load distribution of the load sensor 310, the visual state, the posture state, and the use state of the fixing unit 312 described above. Alternatively, the vehicle occupant situation acquisition unit 171 can also make a final determination as to whether or not the driving preparation state is entered by comprehensively using a plurality of vehicle occupant situations among the five vehicle occupant situations. As an example, when it is determined that the driving preparation state is entered for all of the plurality of vehicle occupant situations, it is finally determined that the driving preparation state is entered, but when it is determined that the driving preparation state is not entered for any one of the plurality of vehicle occupant situations, it is finally determined that the driving preparation state is not entered.

It should be noted that the vehicle occupant situation acquisition unit 171 can derive (set) information (for example, a level value) obtained by converting the degree (high or low) of the method of entering the driving preparation state. For example, when the backrest portion 304 is inclined at a predetermined value θs or more and it is estimated that the vehicle occupant P is sleeping from the image from the in-vehicle cabin camera 400, the level value is set to 1, and when the backrest portion 304 is inclined at a predetermined value θs or more or when it is estimated that the vehicle occupant P is sleeping from the image from the in-vehicle cabin camera 400, the level value is set to 2. When the reclining angle θ is smaller than the predetermined value θs, the driving intention is estimated to be high and the level value is set to 5. It should be noted that the content of setting the level value is not limited thereto.

When the degree of a method of entering the driving preparation state has been converted into a numerical value as described above, the vehicle occupant situation acquisition unit 171 may integrate level values for the degree of method of entering the driving preparation state obtained for each of a plurality of vehicle occupant situations and compare the integrated level value with a threshold value to determine whether or not the driving preparation state is finally entered.

Figure 15:
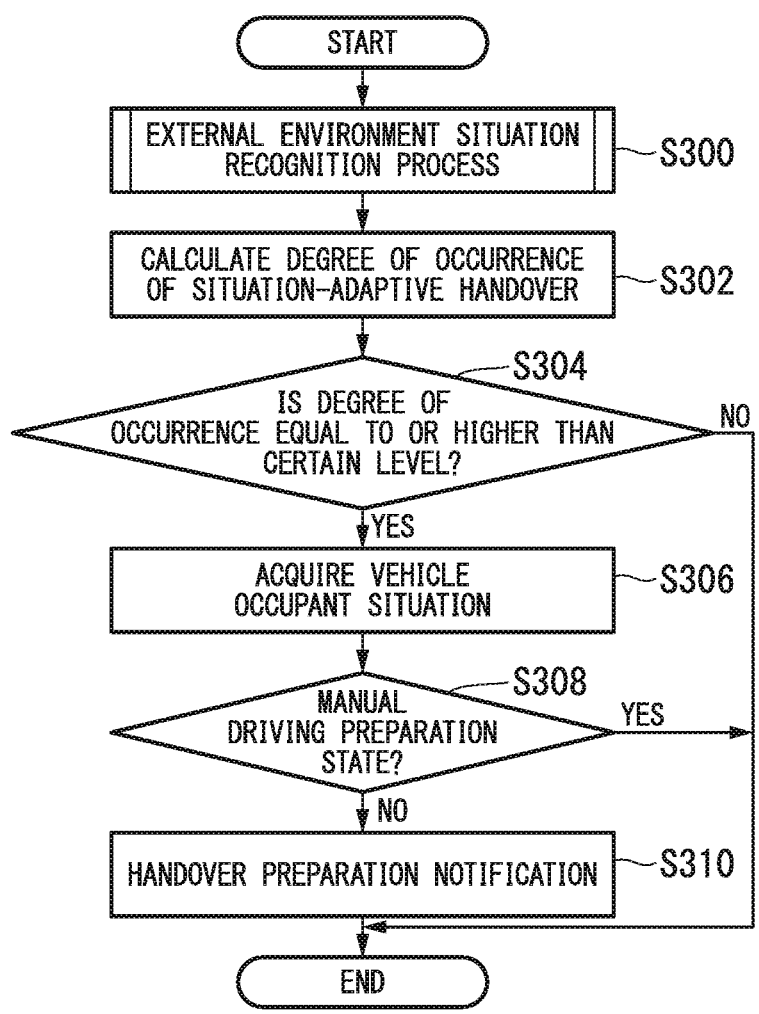
FIG. 15 is a flowchart showing an example of a process procedure that the vehicle control system 100 according to the second embodiment executes in connection with output of a handover preparation notification.

The flowchart of FIG. 15 shows an example of a process procedure that the vehicle control system 100 according to the second embodiment executes in connection with output of the handover preparation notification. The process of FIG. 15 is repeatedly executed at every certain time while the automated driving in the automated driving mode is being executed.

Since processes of steps S300 to S304 in FIG. 15 are the same as the processes of steps S100 to S104 in FIG. 11, description thereof will be omitted herein.

When it is determined in step S304 that a degree of occurrence of the situation-adaptive handover is equal to or greater than a predetermined value, the vehicle occupant situation acquisition unit 171 acquires a vehicle occupant situation (step S306). In step S306, the vehicle occupant situation acquisition unit 171 acquires a situation to be used for a determination as to the driving preparation state from among the five vehicle occupant situations of the reclining angle, the load distribution of the load sensor 310, the visual state, the posture state, and the use state of the fixing unit 312 described above.

The vehicle occupant situation acquisition unit 171 determines whether or not the manual driving preparation state of the vehicle occupant is entered (step S308) using the vehicle occupant situation acquired in step S306.

When it is determined that the manual driving preparation state is not entered, the HMI control unit 170 performs a handover preparation notification (step S310).

On the other hand, when it is determined that the manual driving preparation state is entered, the process shown in FIG. 15 is ended. Thus, when it is determined that the manual driving preparation state is entered, the process of step S310 is skipped and the handover preparation notification is not performed. Thus, the HMI control unit 170 according to the second embodiment determines whether the handover preparation notification is to be output on the basis of the vehicle occupant situation acquired by the vehicle occupant situation acquisition unit 171.

Third Embodiment

Subsequently, a third embodiment will be described. In the second embodiment described above, when it is determined that the driving preparation state is entered, the handover preparation notification is not performed.

On the other hand, in the third embodiment, when it is determined that the driving preparation state is entered, the handover preparation notification is also performed. Further, in the third embodiment, when it is determined that the driving preparation state is not entered, a high degree of handover preparation notification is performed to strongly prompt the driving preparation state to be entered. On the other hand, when it is determined that the driving preparation state is entered, a low degree of handover preparation notification is performed so that the current state is maintained. That is, in the third embodiment, an output aspect of the handover preparation notification is changed according to whether or not the driving preparation state is entered.

In the case of the third embodiment, even when it is determined that the driving preparation state is entered, the handover preparation notification is performed, thereby enhancing safety. Further, since the handover preparation notification when it is determined that the driving preparation state is entered is at a low degree, the vehicle occupant is not likely to feel troublesome for handover preparation notification even when the vehicle occupant has already entered the driving preparation state.

Figure 16:
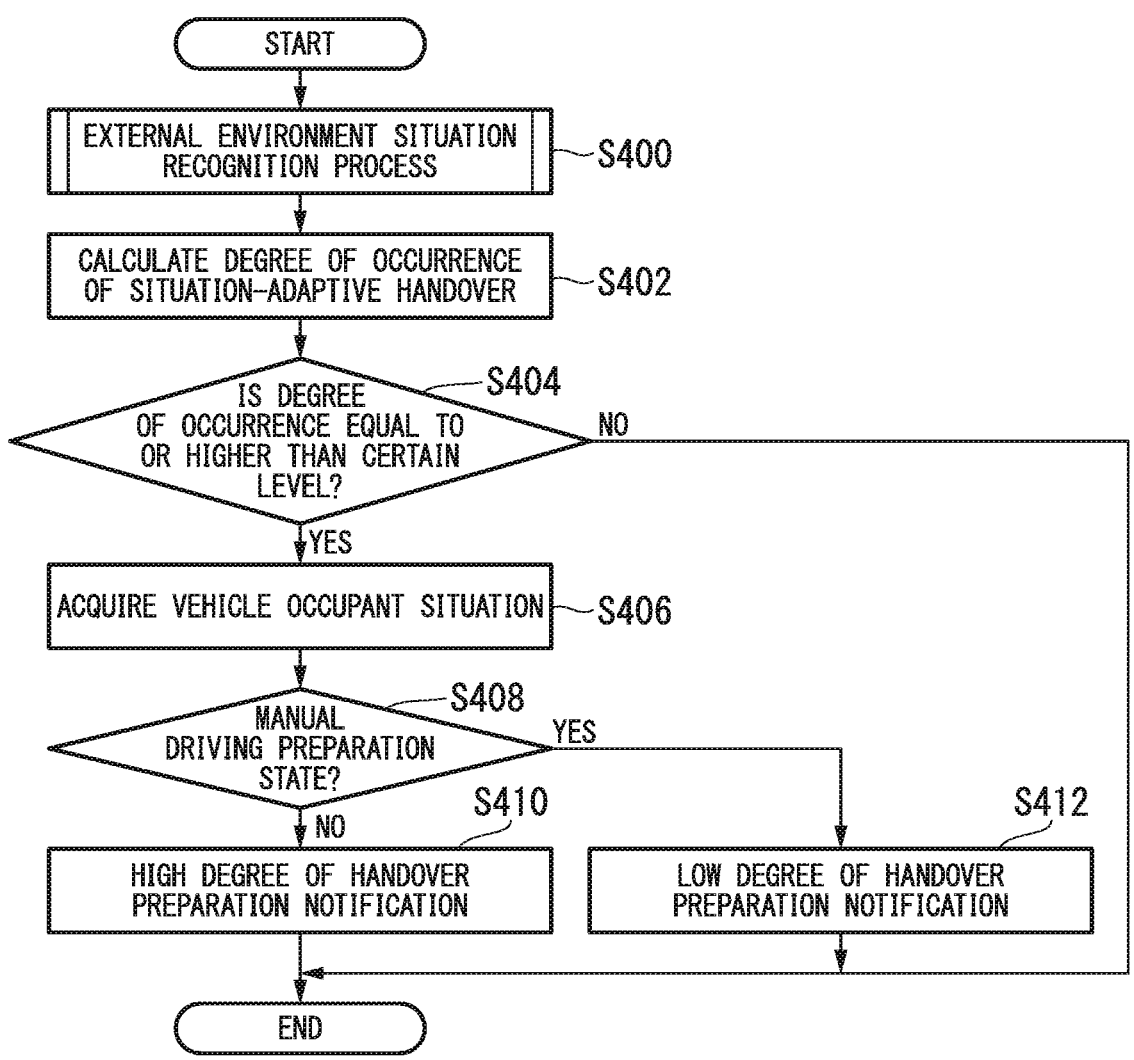
FIG. 16 is a flowchart showing an example of a process procedure that a vehicle control system 100 according to a third embodiment executes in connection with output of a handover preparation notification.

The flowchart of FIG. 16 shows an example of a process procedure that the vehicle control system 100 according to the third embodiment executes in connection with the output of the handover preparation notification. The process of FIG.

16 is repeatedly executed at every certain time while the automated driving in the automated driving mode is being executed.

Further, a configuration of the vehicle control system 100 in the third embodiment may be the same as in FIG. 13.

Since processes of steps S400 to S408 in FIG. 13 are the same as the processes of steps S300 to S308 in FIG. 15, description thereof will be omitted herein.

When it is determined that the manual driving preparation state is not entered, the HMI control unit 170 performs a high degree of handover preparation notification (step S410). On the other hand, when it is determined that the manual driving preparation state is entered, the HMI control unit 170 performs a low degree of handover preparation notification (step S412).

It should be noted that in each of the above-described embodiments, it is sequentially determined whether or not the possibility of occurrence of the situation-adaptive handover is high at fixed intervals during execution of automated driving. However, the vehicle control system 100 may determine a point at which the possibility of occurrence of the situation-adaptive handover is high in the traveling route to an end point of the automated driving in advance at a timing when the automated driving is started. The vehicle control system 100 may perform a handover preparation notification at a predetermined timing before the vehicle reaches the point at which the possibility of occurrence of the situation-adaptive handover is high. Further, the advance determination and the sequential determination may be combined.

Although the modes for carrying out the present invention have been described above by way of embodiments, the present invention is not limited to the embodiments at all, and various modifications and substitutions may be made without departing from the spirit of the present invention.

INDUSTRIAL APPLICABILITY

The present invention can be utilized in a car manufacturing industry.

REFERENCE SIGNS LIST

20 Finder
30 Radar
40 Camera
DD Detection device
50 Navigation device
55 Communication device
60 Vehicle sensor
70 HMI
100 Vehicle control system
110 Target lane determination unit
120 Automatic operation control unit
130 Automated driving mode control unit
140 Subject-vehicle position recognition unit
142 External environment recognition unit
144 Action plan generation unit
146 Trajectory generation unit
146A Traveling aspect determination unit
146B Trajectory candidate generation unit
146C Evaluation and selection unit
150 Switching control unit
152 Vehicle occupant state estimation unit
155 Handover prediction unit
160 Travel control unit
170 HMI control unit
171 Vehicle occupant situation acquisition unit
180 Storage unit
200 Travel driving force output device
210 Steering device
220 Brake device
300 Seat
310 Load sensor
312 Fixing unit
400 In-vehicle cabin camera
500 Steering wheel
M Subject vehicle

What is claimed is:

1. A vehicle control system comprising:
an external environment recognition unit configured to recognize an external environment situation;
an automated driving control unit configured to perform automated driving for automatically controlling at least one of acceleration/deceleration and steering of a subject vehicle, the automated driving control unit executing handover to switch a driving mode from an automated driving mode to a manual driving mode on the basis of the external environment situation recognized by the external environment recognition unit;
a handover prediction unit configured to predict a possibility of occurrence of the handover on the basis of the external environment situation recognized by the external environment recognition unit;
an output unit configured to output information;
an interface control unit configured to control the output unit so that information for prompting a vehicle occupant to prepare for the handover is output when the handover prediction unit predicts that the possibility of occurrence of the handover is high; and
a vehicle occupant situation acquisition unit configured to acquire vehicle occupant situations of the vehicle occupant inside a vehicle who performs a driving operation when manual driving is executed, the vehicle occupant situations including at least a posture situation of the occupant, a visual situation of the occupant, and a use situation of a fixing unit fixing a posture of the occupant,
wherein the interface control unit
integrate level values for a degree of a method of entering a driving preparation state obtained for each of the vehicle occupant situations on the basis of the vehicle occupant situations acquired by the vehicle occupant situation acquisition unit,
determines whether or not a manual driving preparation state of the vehicle occupant is entered using the integrated level values,
changes a degree of output of the information for prompting preparation for the handover on the basis of whether or not the manual driving preparation state of the vehicle occupant is entered, and
outputs information for prompting to maintain a current state when it is determined that the manual driving preparation state of the vehicle occupant is entered.

2. A vehicle control method comprising:
recognizing, by an in-vehicle computer, an external environment situation,
executing, by the in-vehicle computer, handover to switch a driving mode from an automated driving mode to a manual driving mode on the basis of the recognized external environment situation when performing automated driving for automatically controlling at least one of acceleration/deceleration and steering of a subject vehicle, predicting, by the in-vehicle computer, a possibility of occurrence of the handover on the basis of the recognized external environment situation, controlling, by the in-vehicle computer, an output unit configured to output information so that information for prompting a vehicle occupant to prepare for the handover is output when the possibility of occurrence of the handover is predicted to be high, acquiring vehicle occupant situations of the vehicle occupant inside a vehicle who performs a driving operation when manual driving is executed, the vehicle occupant situations including at least a posture situation of the occupant, a visual situation of the occupant, and a use situation of a fixing unit fixing a posture of the occupant, integrating level values for a degree of a method of entering a driving preparation state obtained for each of the vehicle occupant situations on the basis of the acquired vehicle occupant situations, determining whether or not a manual driving preparation state of the vehicle occupant is entered using the integrated level values, changing a degree of output of the information for prompting preparation for the handover on the basis of whether or not the manual driving preparation state of the vehicle occupant is entered, and outputting information for prompting to maintain a current state when it is determined that the manual driving preparation state of the vehicle occupant is entered.

3. A computer-readable non-transitory storage medium storing a vehicle control program for causing an in-vehicle computer to execute a process of:

recognizing an external environment situation, executing handover to switch a driving mode from an automated driving mode to a manual driving mode on the basis of the recognized external environment situation when performing automated driving for automatically controlling at least one of acceleration/deceleration and steering of a subject vehicle, predicting a possibility of occurrence of the handover on the basis of the recognized external environment situation, controlling an output unit configured to output information so that information for prompting a vehicle occupant to prepare for the handover is output when the possibility of occurrence of the handover is predicted to be high, acquiring vehicle occupant situations of the vehicle occupant inside a vehicle who performs a driving operation when manual driving is executed, the vehicle occupant situations including at least a posture situation of the occupant, a visual situation of the occupant, and a use situation of a fixing unit fixing a posture of the occupant, integrating level values for a degree of a method of entering a driving preparation state obtained for each of the vehicle occupant situations on the basis of the acquired vehicle occupant situations, determining whether or not a manual driving preparation state of the vehicle occupant is entered using integrated level values, changing a degree of output of the information for prompting preparation for the handover on the basis of whether or not the manual driving preparation state of the vehicle occupant is entered, and outputting information for prompting to maintain a current state when it is determined that the manual driving preparation state of the vehicle occupant is entered.

* * * * *